United States Patent
Ohwatari et al.

(10) Patent No.: US 8,243,848 B2
(45) Date of Patent: Aug. 14, 2012

(54) RADIO COMMUNICATION APPARATUS AND METHOD

(75) Inventors: Yusuke Ohwatari, Yokohama (JP); Anass Benjebbour, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 305 days.

(21) Appl. No.: 12/763,485

(22) Filed: Apr. 20, 2010

(65) Prior Publication Data

US 2010/0272211 A1  Oct. 28, 2010

(30) Foreign Application Priority Data

Apr. 23, 2009  (JP) .................................. 2009-105638

(51) Int. Cl.
*H04L 27/00* (2006.01)
(52) U.S. Cl. ......................... 375/295; 375/260; 455/522
(58) Field of Classification Search .................. 375/260, 375/267, 295, 299; 455/13.4, 39, 522, 574, 455/91, 101, 127.5, 127.1
See application file for complete search history.

(56) References Cited

U.S. PATENT DOCUMENTS

| | | | | |
|---|---|---|---|---|
| 7,929,632 | B2 * | 4/2011 | Shao | 375/267 |
| 2009/0016463 | A1 * | 1/2009 | Roh | 375/295 |
| 2009/0231139 | A1 * | 9/2009 | Heurtier | 340/572.7 |
| 2010/0104032 | A1 * | 4/2010 | Clerckx et al. | 375/260 |
| 2010/0208838 | A1 * | 8/2010 | Lee et al. | 375/267 |

OTHER PUBLICATIONS

G.J. Foschini, et al., "Coordinating multiple antenna cellular networks to achieve enormous spectral efficiency", *MIMO Wireless and Mobile Communications*, IEE Proc.-Commun., vol. 153, No. 4, Aug. 2006, pp. 548-555.
Shenfa Liu, et al., "Multi-level Zero-forcing Method for Multiuser Downlink System with Per-antenna Power Constraint", IEEE, 2007, pp. 2248-2252.
Tian Lan, et al., "Input Optimization for Multi-Antenna Broadcast Channels with Per-Antenna Power Constraints", IEEE Communications Society Globecom 2004, pp. 420-424.
Yusuke Ohwatari, et al., "Reduced-Complexity Transmit Power Optimization Techniques for Multiuser MIMO with Per-Antenna Power Constraint", Forty-Sixth Annual Allerton Conference, IEEE, Sep. 23-26, 2008, pp. 34-38.

* cited by examiner

*Primary Examiner* — Jean B Corrielus
(74) *Attorney, Agent, or Firm* — Oblon, Spivak, McClelland, Maier & Neustadt, L.L.P.

(57) ABSTRACT

A disclosed radio communication method includes precoding modulated information signal sequences to calculate transmit weight information, setting initial transmit power based on prior information including the calculated transmit weight information, generating an objective function of a user channel capacity for a constrained optimization problem based on the transmit weight information and the initial transmit power, generating a new objective function by adding a barrier function to the objective function, using an initial temporary barrier parameter to initiate iteration of an optimization operation for the new objective function, setting an initial barrier parameter based on comparison between the current and previous outputs, calculating transmit power to optimize the new objective function in accordance with an interior point method based on the initial transmit power and the initial barrier parameter and allocating the calculated transmit power to the respective transmit antennas.

20 Claims, 16 Drawing Sheets

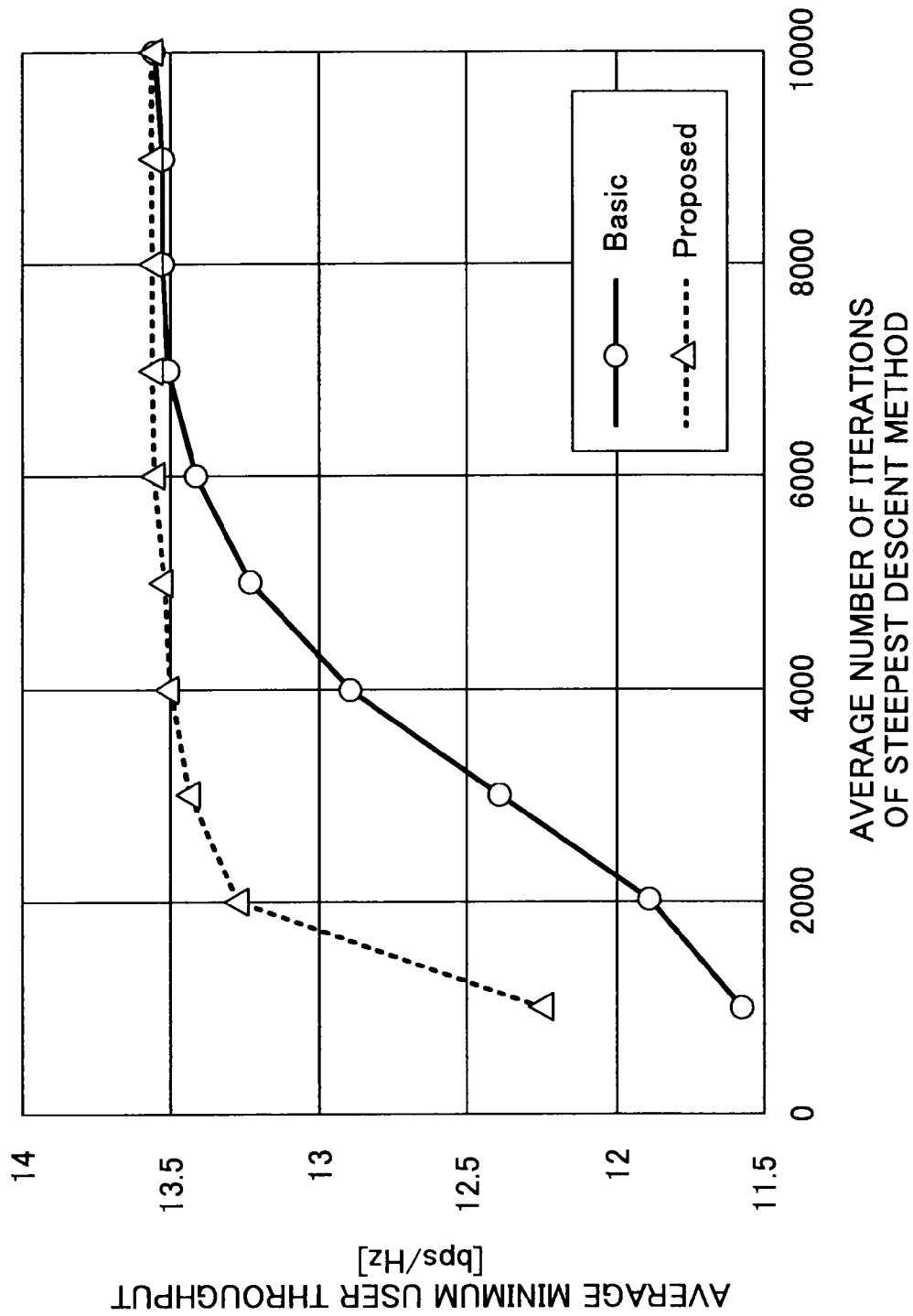

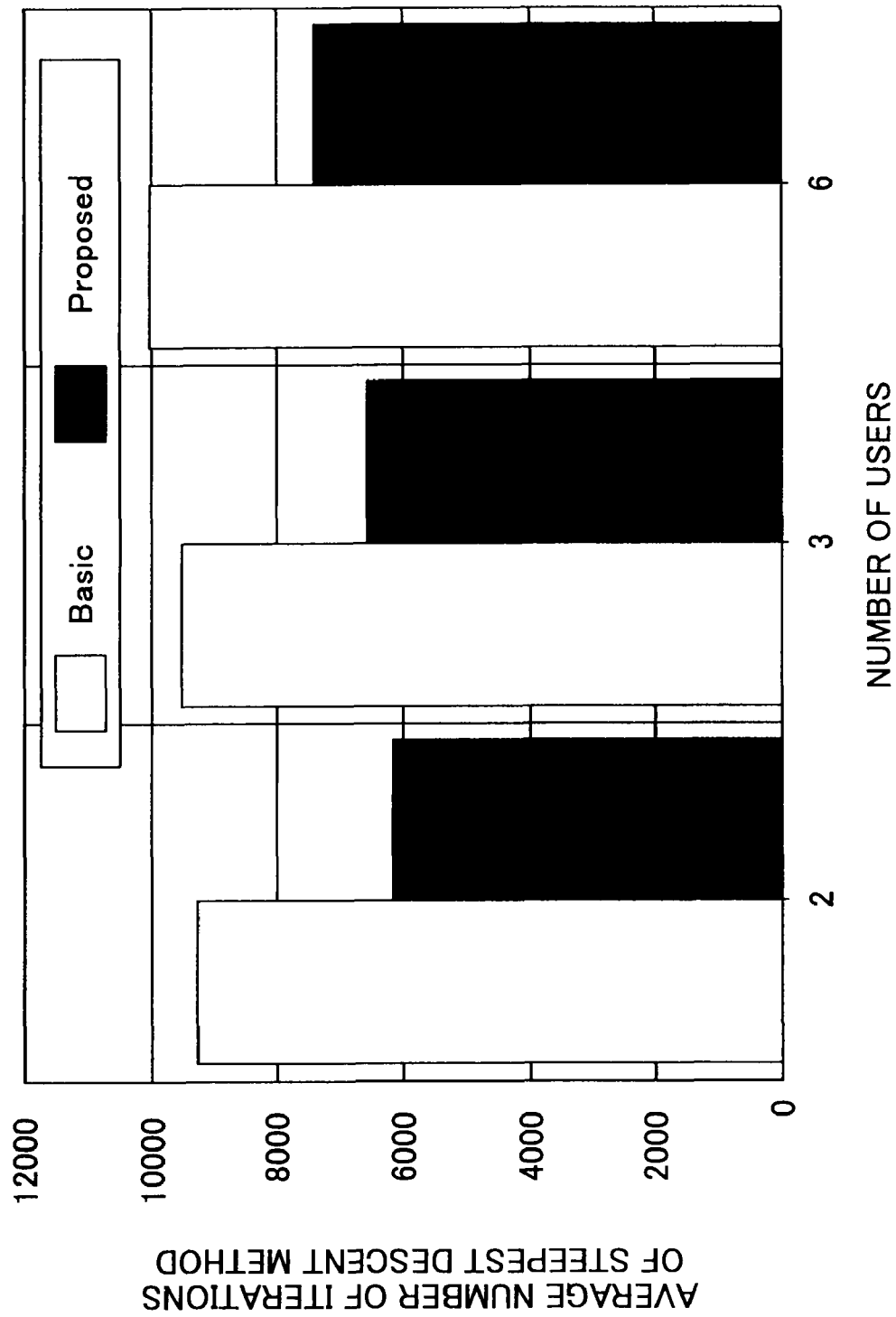

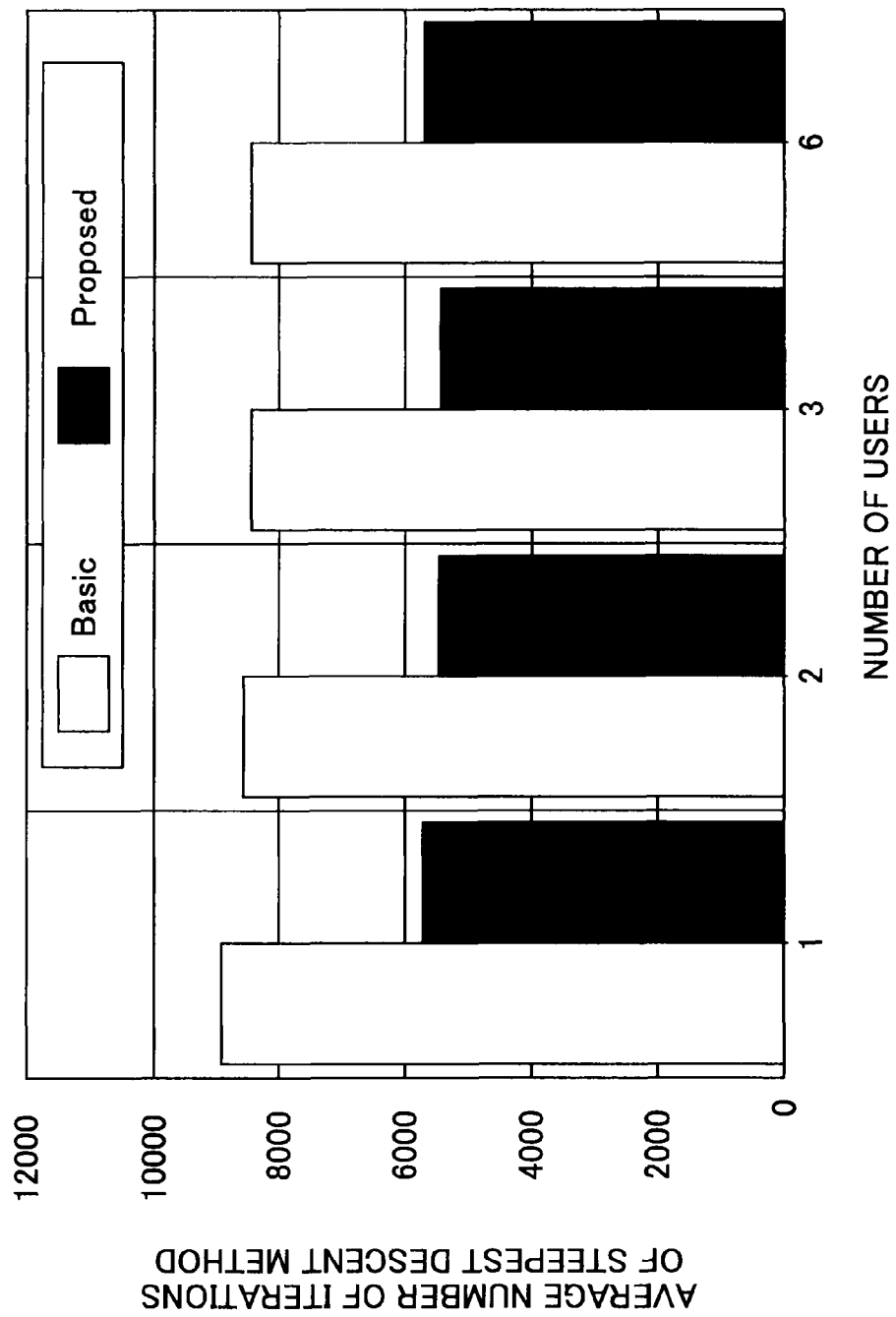

RADIO COMMUNICATION APPARATUS AND METHOD

BACKGROUND OF THE INVENTION

1. Field of the Invention

Embodiments discussed herein are directed to a radio communication apparatus and method. The embodiments particularly relate to a radio communication apparatus that conducts radio communication over MIMO downlink channels in precoding transmission under the state where each transmit antenna or each transmit antenna group has a transmit power limit.

2. Description of the Related Art

In recent years, a MIMO (Multiple-Input Multiple-Output) transmission scheme has been intensively investigated to improve frequency or spectral utilization efficiency. In this MIMO transmission scheme, for improved throughput, precoding transmissions have been intensively investigated for both a SU (Single User)-MIMO system and a MU (Multi User)-MIMO system designed to apply the MIMO transmission scheme to multiple users. In accordance with the MIMO scheme, communications are made between a communication terminal having multiple antennas and a base station having multiple antennas. In the SU-MIMO scheme, one communication terminal communicates to a base station. In the MU-MIMO scheme, multiple communication terminals communicate to a base station simultaneously.

In a unitary precoding scheme commonly used in a SU-MIMO system, a transmitter must calculate power amounts allocated to respective transmit streams under a fixed total amount of transmit power. In the case where the unitary precoding scheme is employed, a power amplifier capable of generating the total amount of transmit power must be deployed for each transmit antenna. The deployment of the power amplifiers capable of generating the total amount of transmit power at the respective transmit antennas may increase costs of implementing a high-order MIMO system such as a 8×8 MIMO system. For this reason, it is being discussed to provide transmit power limits for the respective transmit antennas and calculate power amounts allocated to different transmit streams.

On the other hand, in a MU-MIMO system, coordinate transmission between base stations in accordance with the MU-MIMO scheme is studied, and significant improvement of the throughput is reported. In the system conducting the coordinate transmission between base stations in accordance with the MU-MIMO scheme, different power amplifiers may be used for different antennas in the base stations or for the different base stations. As a result, characteristics of the respective power amplifiers must be taken into account.

In the above-stated MIMO system, a base station performs precoding on data stream to transmit to respective users based on feedback information, such as channel information, from the users. Based on the feedback information from the users, the base station performs the precoding on the data streams to transmit to the respective users. In the precoding, whenever the feedback information such as the channel information is updated, the base station needs to control transmit power allocated to the transmit streams depending on precoding weights for transmit antennas due to the transmit power limits of the respective transmit antennas in the base station or base stations.

A first article G. J. Foschini, K. Karakayali and R. A. Valenzuela, "Coordinating multiple antenna cellular networks to achieve enormous spectral efficiency", IEEE Proceedings Communications, vol. 153, No. 4, pp. 548-555, August 2006 discloses that a Zero-forcing precoding scheme, which is a precoding scheme where transmissions are conducted to avoid interference between users, is utilized in the system for conducting the coordinate transmission between base stations in accordance with the MU-MIMO scheme in consideration of the characteristics of respective power amplifiers. This article exhibits an optimization problem on transmit power such that the respective users have even channel capacities. The first article discloses that solving the optimization problem can significantly improve the channel capacity compared with the case where the coordinate transmission is not conducted between the base stations.

A second article S. Liu, N. Hu, Z. He, K. Niu and W. Wu, "Multi-level zero-forcing method for multiuser downlink system with per-antenna power constraint", VTC 2007-Spring, pp. 2248-2252, April 2007 discloses an optimization problem on transmit weights and transmit power for precoding in the MU-MIMO coordinated base stations transmission system such that the channel capacity of the overall system can be maximized. In this article, it is also shown that analyzing the optimization problem can improve the channel capacity.

A third article W. Yu and T. Lan, "Input optimization for multi-antenna broadcast channels with per-antenna power constraints", IEEE GLOBECOM2004, vol. 1, pp. 420-424, December 2004 discloses an optimization problem using uplink and downlink duality and a solution thereof in the MU-MIMO coordinated base stations transmission system. This article exhibits that analyzing the optimization problem can improve convergence speed.

A fourth article Y. Ohwatari, A. Benjebbour, J. Hagiwara, and T. Ohya, "Reduced-complexity transmit power optimization techniques for multiuser MIMO with per-antenna power constraint", Allerton2008, pp. 34-38, September 2008 discloses an optimization problem on transmit power in a MU-MIMO precoding system such that channel capacity is maximized by using one linear precoding scheme a block diagonalization Zero-forcing (BD-ZF) scheme. This article exhibits a method for sequentially updating barrier parameters for an interior point method in the case where a combination of the interior point method and a steepest descent method is utilized for optimization, an initial transmit power setup method depending on distribution of eigenvalues and an initial transmit power setup method using transmit weight information as prior information. The fourth article discloses that solving the optimization problem can improve convergence speed.

SUMMARY OF THE INVENTION

The above-stated power allocation optimization problems fall into constrained nonlinear optimization problems. Calculation of the constrained nonlinear optimization problems may involve high computational complexity. For example, in the case where the interior point method is solved using the steepest descent method, the solution can be derived through a simple analytic algorithm while an larger amount of calculation may be required for convergence.

However, the first and second articles do not discuss reduction in the calculation amount required to solve the optimization problems.

Also, the third article focuses on the case where transmit weights and transmit power allocation for precoding are optimized simultaneously and does not discuss that only the transmit power allocation is optimized separately from the transmit weights. In other words, the third article does not study the optimization of only the transmit power allocation to users. In addition, the third article is focused on maximization of an overall system channel capacity and does not take into account the transmit power allocation such that channel capacities of respective users are made uniform.

Also, the fourth article discusses the method of sequentially updating barrier parameters in the interior point method but does not study how to set initial barrier parameters which may significantly affect the calculation amount for the optimization.

Accordingly, the present invention addresses the above-mentioned problems and is directed to provide radio communication apparatus and method that can allocate the transmit power to one or more users optimally and reduce the calculation amount required to calculate the transmit power under the state where the transmit power is restricted for each transmit antenna and/or each group of transmit antennas.

In order to overcome the above-mentioned problems, one aspect of the present invention relates to a radio communication apparatus including multiple transmit antennas, the radio communication apparatus for allocating transmit power to the transmit antennas below transmit power limits of the respective transmit antennas or multiple transmit antenna groups, each of the transmit antenna groups consisting of one or more of the multiple transmit antennas, to transmit a radio signal, the apparatus comprising: a modulation unit configured to modulate information signal sequences to transmit to respective users; a precoding weight calculation unit configured to precode the modulated information signal sequences to calculate transmit weight information for the respective users; an initial transmit power setup unit configured to set initial transmit power based on prior information including the calculated transmit weight information or eigenvalue distribution information; an initial barrier parameter setup unit configured to generate an objective function of a user channel capacity for a constrained optimization problem based on the calculated transmit weight information and the set initial transmit power, generate a new objective function by adding a barrier function adjusted with a barrier parameter to the objective function for the constrained optimization problem, use an initial temporary barrier parameter to initiate iteration of an optimization operation for the new objective function, store an output of each step operation in the optimization operation, and set an initial barrier parameter based on comparison between the current output and the previous output; a transmit power calculation unit configured to calculate transmit power to optimize the new objective function in accordance with an interior point method based on the initial transmit power set by the initial transmit power setup unit and the initial barrier parameter set by the initial barrier parameter setup unit; and a transmit unit configured to allocate the calculated transmit power to the respective transmit antennas to transmit the radio signal.

Another aspect of the present invention relates to a method for use in a radio communication apparatus including multiple transmit antennas, the radio communication apparatus for allocating transmit power to the transmit antennas below transmit power limits of the respective transmit antennas or multiple transmit antenna groups, each of the transmit antenna groups consisting of one or more of the multiple transmit antennas, to transmit a radio signal, the method comprising: modulating information signal sequences to transmit to respective users; precoding the modulated information signal sequences to calculate transmit weight information for the respective users; setting initial transmit power based on prior information including the calculated transmit weight information or eigenvalue distribution information; generating an objective function of a user channel capacity for a constrained optimization problem based on the calculated transmit weight information and the set initial transmit power and generating a new objective function by adding a barrier function adjusted with a barrier parameter to the objective function for the constrained optimization problem; using an initial temporary barrier parameter to initiate iteration of an optimization operation for the new objective function, storing an output of each step operation in the optimization operation, and setting an initial barrier parameter based on comparison between the current output and the previous output; calculating transmit power to optimize the new objective function in accordance with an interior point method based on the set initial transmit power and the set initial barrier parameter; and allocating the calculated transmit power to the respective transmit antennas to transmit the radio signal.

According to the aspects of present invention, the disclosed radio communication apparatus and method can allocate the transmit power to one or more users optimally and reduce the calculation amount required to calculate the transmit power under the state where the transmit power is restricted for each transmit antenna and/or each group of transmit antennas.

Additional objects and advantages of the invention (embodiment) will be set forth in part in the description which follows, and in part will become obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIGS. 13A and 13B illustrate convergence characteristics and calculation amounts required for the convergence in accordance with Fairness criteria in a radio communication apparatus according to one embodiment of the present invention; and FIGS. 14A and 14B illustrate convergence characteristics and calculation amounts required for the convergence in accordance with Sum-rate criteria in a radio communication apparatus according to one embodiment of the present invention.

DETAILED DESCRIPTION OF THE PREFERRED EMBODIMENTS

Figure 1:
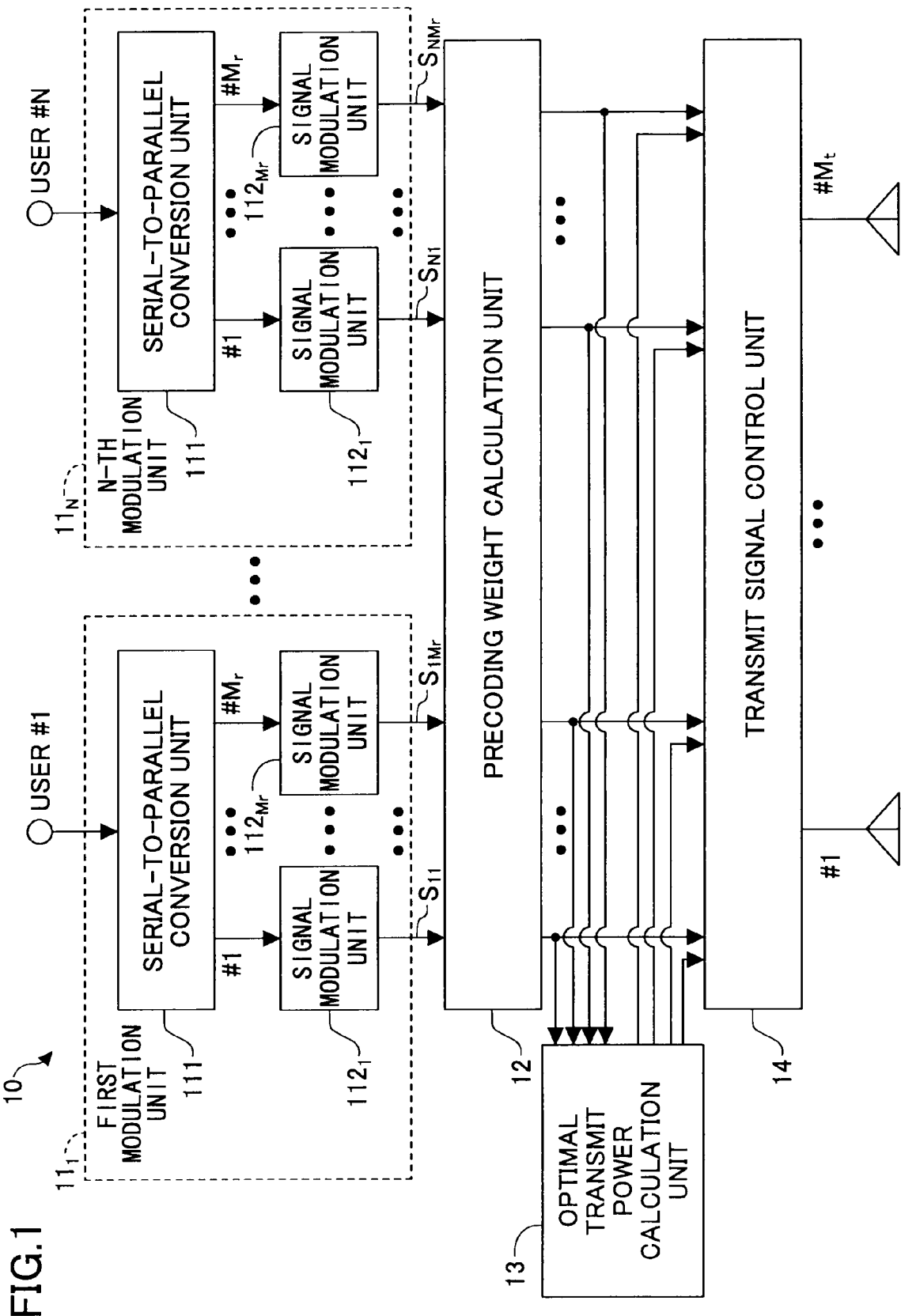
FIG. 1 is a functional block diagram illustrating a radio communication apparatus according to one embodiment of the present invention.

Embodiments of the present invention are described with reference to the accompanying drawings. Throughout the drawings, the same functions are designated by the same reference numerals, and descriptions thereof are not repeated.

One aspect of the present invention relates to a radio communication apparatus including multiple transmit antennas, the radio communication apparatus for allocating transmit power to the transmit antennas below transmit power limits of the respective transmit antennas or multiple transmit antenna groups, each of the transmit antenna groups consisting of one or more of the multiple transmit antennas, to transmit a radio signal, the apparatus comprising: a modulation unit configured to modulate information signal sequences to transmit to respective users; a precoding weight calculation unit configured to precode the modulated information signal sequences to calculate transmit weight information for the respective users; an initial transmit power setup unit configured to set initial transmit power based on prior information including the calculated transmit weight information or eigenvalue distribution information; an initial barrier parameter setup unit configured to generate an objective function of a user channel capacity for a constrained optimization problem based on the calculated transmit weight information and the set initial transmit power, generate a new objective function by adding a barrier function adjusted with a barrier parameter to the objective function for the constrained optimization problem, use an initial temporary barrier parameter to initiate iteration of an optimization operation for the new objective function, store an output of each step operation in the optimization operation, and set an initial barrier parameter based on comparison between the current output and the previous output; a transmit power calculation unit configured to calculate transmit power to optimize the new objective function in accordance with an interior point method based on the initial transmit power set by the initial transmit power setup unit and the initial barrier parameter set by the initial barrier parameter setup unit; and a transmit unit configured to allocate the calculated transmit power to the respective transmit antennas to transmit the radio signal.

According to this aspect, in the calculation of the transmit power, the initial barrier parameter $r(1)$ adapted for an optimization problem is set, which can allocate the optimal transmit power for respective users while reducing iterations in the interior point method required for convergence. In other words, the initial barrier parameter $r(1)$ adapted for the transmit power optimization problem is set under the state where each transmit antenna or each transmit antenna group has a transmit power limit. Accordingly, the optimal transmit power can be allocated for respective users while reducing iterations in the interior point method required for convergence.

In one embodiment, the initial barrier parameter setup unit may use the objective function for the constrained optimization problem to generate the output of each step operation in the optimization operation. In another embodiment, the initial barrier parameter setup unit may use the new objective function to generate the output of each step operation in the optimization operation.

According to the embodiments, the objective function for the constrained optimization problem and/or the objective function (new objective function) in the interior point method is used to generate outputs of individual step operations in the interior point method. Accordingly, the optimal transmit power can be allocated to the respective users in the state where each transmit antenna or each transmit antenna group has a transmit power limit.

In one embodiment, the initial transmit power setup unit may set the initial transmit power for each optimization operation by the initial barrier parameter setup unit. In another embodiment, the initial barrier parameter setup unit may use the transmit power derived in the previous optimization operation to iterate the optimization operation for the new objective function.

According to the embodiments, the initial barrier parameter $r(1)$ is set suitable for the optimization problem using the initial transmit power adapted for the transmit power optimization problem. Accordingly, the optimal transmit power can be allocated to the respective users in the state where each transmit antenna or each transmit antenna group has a transmit power limit.

In one embodiment, the initial barrier parameter setup unit or the transmit power calculation unit may perform the optimization operation in accordance with a steepest descent method to optimize the new objective function. The transmit power calculation unit may perform the optimization below the transmit power limit in accordance with the steepest descent method in the optimization of the new objective function.

According to the embodiments, optimal solutions can be calculated in a simple analytic algorithm through the optimization using the steepest descent method.

In one embodiment, the initial barrier parameter setup unit or the transmit power calculation unit may terminate step iteration in the steepest descent method if a variation of the new objective function to a variation of the transmit power is within a predefined threshold, if a variation of the objective function for the constrained optimization problem to an increment of the step iteration is within a predefined threshold, or if a number of the step iterations exceeds a predefined threshold.

According to the embodiments, if any of the condition where a variation of the new objective function to a variation of the transmit power is within a predefined threshold, the condition where a variation of the objective function for the constrained optimization problem to an increment of the step iteration is within a predefined threshold, and the condition where a number of the step iterations exceeds a predefined threshold is satisfied, the convergence of the steepest descent method is determined to find the optimal solutions.

In one embodiment, the transmit power calculation unit may terminate step iteration in the interior point method if the barrier parameter is below a predefined threshold or if a variation of the objective function for the constrained optimization problem to an increment of the step iteration is within a predefined threshold.

According to the embodiment, if any of the condition where the barrier parameter is below a predefined threshold or the condition where a variation of the objective function for the constrained optimization problem to an increment of the step iteration is within a predefined threshold is satisfied, the convergence is determined for each step in the interior point method to find the optimal solutions.

In one embodiment, the transmit power calculation unit may perform the optimization such that channel capacities for the respective users are made uniform based on the transmit power limit.

In one embodiment, the transmit power calculation unit may perform the optimization such that an overall system channel capacity is maximized based on the transmit power limit.

According to the embodiments, the optimization is conducted to maximize the overall system channel capacity. Accordingly, an optimal solution for maximizing the sum of the user channel capacities after power allocation can be derived.

According to the above embodiments, the radio communication apparatus can determine transmit power for transmit streams for respective users and control transmissions of signals based on the determined transmit power under the state where each transmit antenna and/or each transmit antenna group has a transmit power limit.

Embodiments are described with reference to the drawings in detail below.

First Embodiment

Arrangement of Radio Communication Apparatus

FIG. 1 is a block diagram illustrating an exemplary arrangement of a radio communication apparatus 10 according to the first embodiment. In this embodiment, the radio communication apparatus 10 includes a radio transmitter. Preferably, the radio communication apparatus 10 is installed in a base station and transmits downlink signals. Also, the radio communication apparatus 10 may be installed in a user terminal.

The radio communication apparatus 10 includes N modulation units 11 (first modulation unit $11_1$ through n-th modulation unit $11_N$ (N is an positive integer)), a precoding weight calculation unit 12 coupled to the modulation units 11, an optimal transmit power calculation unit 13 coupled to the precoding weight calculation unit 12, a transmit signal control unit 14 coupled to the precoding weight calculation unit 12 and the optimal transmit power calculation unit 13 and multiple antennas #1-#$M_t$ coupled to the transmit signal control unit 14.

For example, the number of the modulation units 11 may be equal to the number of users (N). Each of the modulation units 11 includes a serial-to-parallel conversion unit 111 and $M_r$ signal modulation units 112 ($112_1$-$112_{mr}$) coupled to the serial-to-parallel conversion unit 111. For example, the number $M_r$ may be equal to the number of user antennas. The $M_r$ signal modulation units 112 are coupled to the precoding weight calculation unit 12.

[Arrangement of Optimal Transmit Power Calculation Unit 13]

Figure 2:
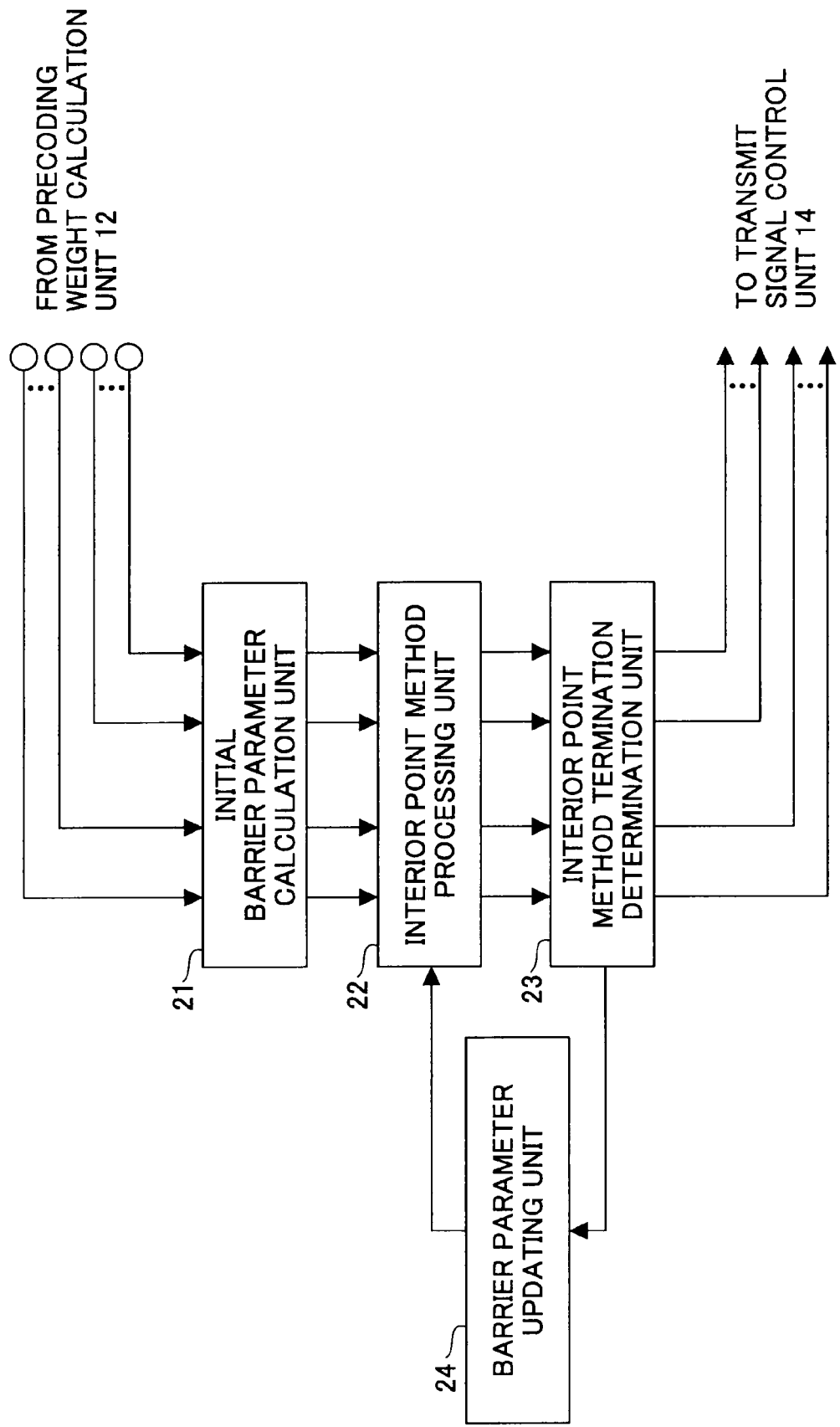
FIG. 2 is a partial block diagram of the radio communication apparatus according to one embodiment of the present invention.

FIG. 2 illustrates an exemplary arrangement of the optimal transmit power calculation unit 13 in the radio communication apparatus 10 according to one embodiment of the present invention.

The optimal transmit power calculation unit 13 includes an initial barrier parameter calculation unit 21, an interior point method processing unit 22 coupled to the initial barrier parameter calculation unit 21, a barrier parameter updating unit 24 coupled to the interior point method processing unit 22 and an interior point method termination determination unit 23 coupled to the interior point method processing unit 22 and the barrier parameter updating unit 24.

[Arrangement of Initial Barrier Parameter Calculation Unit 21]

Figure 3:
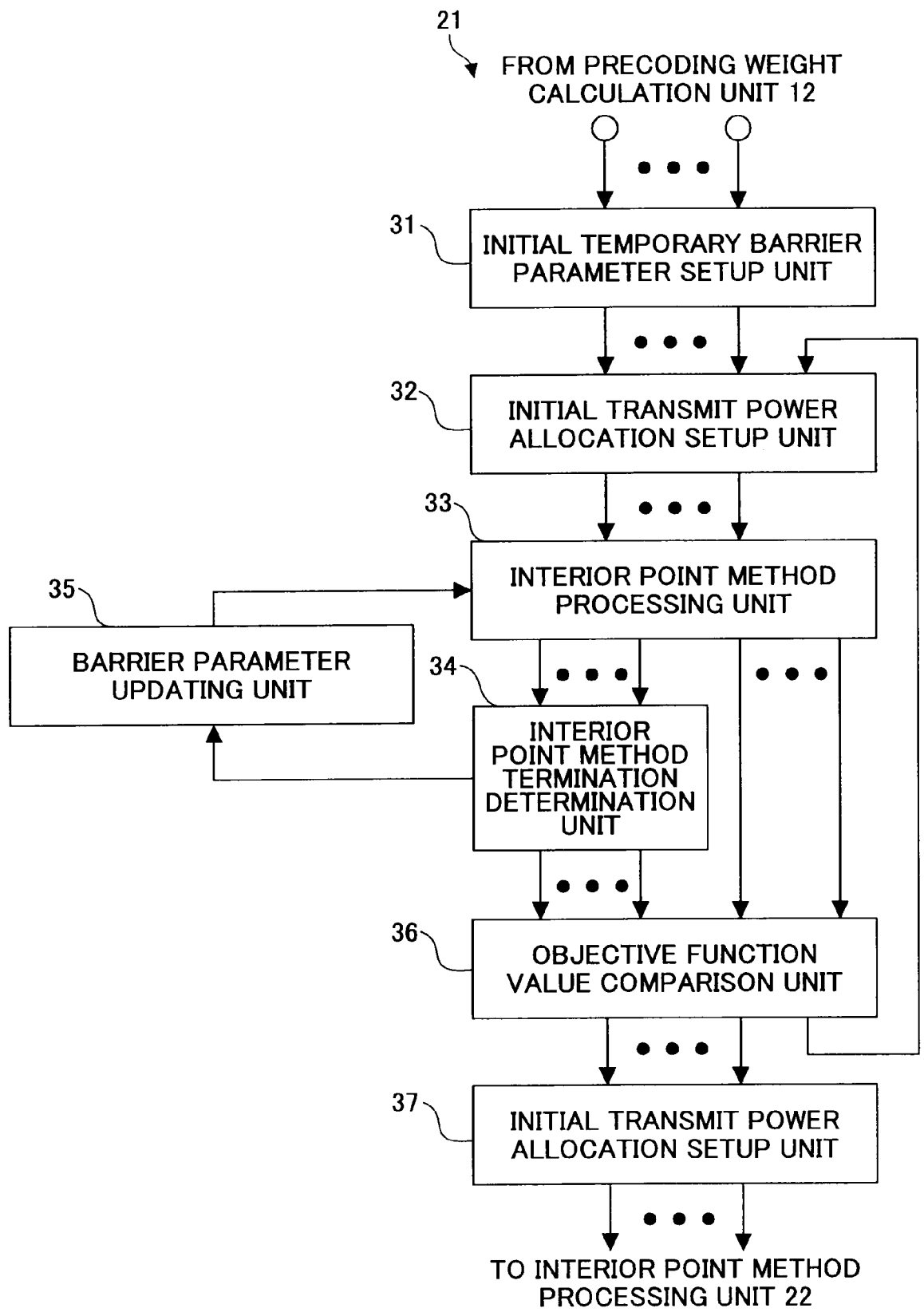
FIG. 3 is a partial block diagram of the radio communication apparatus according to one embodiment of the present invention.

FIG. 3 illustrates an exemplary arrangement of the initial barrier parameter calculation unit 21 in the radio communication apparatus 10 according to one embodiment of the present invention.

The initial barrier parameter calculation unit 21 includes an initial temporary barrier parameter setup unit 31, an initial transmit power allocation setup unit 32 coupled to the initial temporary barrier parameter setup unit 31, an interior point method processing unit 33 coupled to the initial transmit power allocation setup unit 32, a barrier parameter updating unit 35 coupled to the interior point method processing unit 33, an interior point method termination determination unit 34 coupled to the barrier parameter updating unit 35 and the interior point method processing unit 33, an objective function value comparison unit 36 coupled to the interior point method processing unit 33 and the interior point method termination determination unit 34 and an initial transmit power allocation setup unit 37 coupled to the objective function value comparison unit 36.

[Functional Blocks in Radio Communication Apparatus 10]

Operations of the radio communication apparatus 10 are described. In this description, functional blocks in the radio communication apparatus 10 are discussed. In this embodiment, the number of transmit antennas is designated by $M_t$, the number of users is designated by N, and the number of user antennas is designated by $M_r$.

Also in this embodiment, channel information based BD-ZF (Block Diagonalization-Zero Forcing) is utilized for precoding in MU-MIMO transmissions. Note that any other channel information based MU-MIMO precoding scheme may be utilized for the precoding. The channel information based MU-MIMO precoding schemes may include a ZF, a MMSE (Minimum Mean Square Error), a DPC (Dirty-Paper Coding) and other schemes. Also, in another precoding scheme, transmit weight vectors may be selected from a codebook.

The modulation units 11 perform operations as set forth below. Incoming information signal sequences to transmit to respective users are supplied to the modulation units $11_1$-$11_N$. The serial-to-parallel conversion unit 111 perform serial-to-parallel conversion on the incoming information signal sequence to generate Mr information signal sequences and assign them to respective transmit streams to be multiplexed. The serial-to-parallel conversion unit 111 supplies the $M_r$ information signal sequences to the signal modulation units $112_1$-$112_{Mr}$.

The signal modulation unit 112 modulates the incoming information signal sequence to generate a transmit signal $s_{k,j}$. The transmit signal $s_{k,j}$ represents a signal transmitted in the j-th transmit stream ($1 \leq j \leq M_r$) for the k-th user ($1 \leq k \leq N$). Also, a $M_r$-dimensional transmit signal vector $s_k$ for the k-th user is defined as, $$S_k = [S_{k,1}, \ldots, S_{k,j}, \ldots S_{k,Mr}]^T \quad (1),$$

where the superscript T represents transposition.

Here, letting a channel matrix of $M_r \times M_t$ MIMO channels for the k-th user be $H_k$, a BD-ZF transmit weight matrix $W_{BD-ZF,k}$ of size $M_t \times M_r$ for the k-th user is generated to satisfy the formula (2), $$H_k W_{BD-ZF,m} = 0 (k \neq m) \quad (2)$$

An equivalent channel matrix of size $M_r \times M_r$ for the k-th user resulting from application of the BD-ZF is defined in the formula (3). The equivalent channel matrix $H_k'$ is subjected to singular value decomposition (SVD).

$$H_k' = H_k W_{BD-ZF,k} = U_k \Lambda_k V_k^H \quad (3)$$

$$\Lambda_k = \begin{bmatrix} \sqrt{\lambda_{k,1}} & \cdots & 0 \\ \vdots & \ddots & \vdots \\ 0 & \cdots & \sqrt{\lambda_{k,M_r}} \end{bmatrix},$$

where the superscript H represents a Hermitian transpose and $\lambda_{k,j}$ represents an eigenvalue of $H_k'^H H_k'$.

Using $V_k$ obtained from the above equation (3) and the $W_{BD-ZF,k}$ obtained from the above equation (2), let a transmit weight matrix of size $M_t \times M_r$ for the k-th user be $W_k$.

$$W_k = W_{BD-ZF,m} V_k = \begin{bmatrix} w_{k,1,1} & \cdots & w_{k,M_t,1} \\ \vdots & \ddots & \vdots \\ w_{k,1,M_r} & \cdots & w_{k,M_t,M_r} \end{bmatrix} \quad (4)$$

The precoding weight calculation unit 12 derives the transmit weight matrix $W_k$. Then, the precoding weight calculation unit 12 supplies components $w_{k,q,j}$ ($1 \leq q \leq M_t$) and eigenvalues $\lambda_{k,j}$ of the transmit weight matrix $W_k$ as transmit weight related information to the optimal transmit power calculation unit 13. Also, the precoding weight calculation unit 12 supplies the transmit weight matrix $W_k$ and the transmit signal vector $s_k$ to the transmit signal control unit 14.

The transmit signal control unit 14 in turn uses the supplied $W_k$ and $s_k$ together with transmit power $P_{k,j}$ assigned to the j-th transmit stream for the k-th user that is derived in the optimal transmit power calculation unit 13 as discussed below to generate an $M_t$-dimensional transmit signal vector $x_k$ after the precoding as follows, and supplies the vector $x_k$ to users, $$x_k = W_k \begin{bmatrix} \sqrt{P_{k,1}} & \cdots & 0 \\ \vdots & \ddots & \vdots \\ 0 & \cdots & \sqrt{P_{k,j}} \end{bmatrix} s_k. \quad (5)$$

Also, letting an $M_r$-dimensional received signal vector for the k-th user be $y_k$ and an $M_r$-dimensional noise vector be $n_k$, the receive signal is represented as follows, $$y_k H_k x_k + n_k \quad (6),$$

Here, letting a receive weight matrix of size $M_r \times M_r$ for the k-th user be $U_k^H$ in the formula (3), multiplication of the receive weight matrix $U_k^H$ and the received signal vector $y_k$ is represented as follows, $$\begin{aligned} U_k^H y_k &= U_k^H H_k x_k + U_k^H n_k \quad (7) \\ &= U_k^H H_k W_{BD-ZF,k} V_k^H s_k + U_k^H n_k \\ &= \Lambda_k s_k + U_k^H n_k \\ &= \begin{bmatrix} \sqrt{\lambda_{k,1}} & \cdots & 0 \\ \vdots & \ddots & \vdots \\ 0 & \cdots & \sqrt{\lambda_{k,M_r}} \end{bmatrix} s_k + U_k^H n_k. \end{aligned}$$

Thus, the formula (7) means that spatially multiplexed and transmitted signals can be received at the users without interference. Also, letting the noise power be $\sigma^2$, a received $SNR_{k,j}$ for the j-th transmit stream for the k-th user is represented as follows, $$SNR_{k,j} = \frac{\lambda_{k,j} P_{k,j}}{\sigma^2}. \quad (8)$$

Using this received $SNR_{k,j}$ as specified in the formula (8), a MIMO channel capacity $C_k$ for the k-th user is represented as follows, $$\begin{aligned} C_k &= \sum_{j=1}^{M_r} \log_2(1 + SNR_{k,j}) \quad (9) \\ &= \sum_{j=1}^{M_r} \log_2\left(1 + \frac{\lambda_{k,j} P_{k,j}}{\sigma^2}\right). \end{aligned}$$

[Optimal Transmit Power Calculation Unit 13]

An exemplary operation of the optimal transmit power calculation unit 13 is described below.

The optimal transmit power calculation unit 13 receives the components $w_{k,q,j}$ and the eigenvalues $\lambda_{k,j}$ of the transmit weight matrix $W_k$ as transmit weight related information from the precoding weight calculation unit 12. The optimal transmit power calculation unit 13 uses the transmit weight related information to derive transmit power $P_{k,j}$ to satisfy a transmit power limit $P_{max,q}$ of the q-th transmit antenna. Specifically, the optimal transmit power calculation unit 13 solves an optimization problem as follows, $$\text{maximize} \min_k C_k = \min_k \sum_{j=1}^{M_r} \log_2(1 + SNR_{k,j}) \quad (10)$$

$$\text{s.t.} \sum_{k=1}^{N} \sum_{j=1}^{M_r} |w_{k,q,j}|^2 P_{k,j} \leq P_{max,q} \quad (11)$$

$$P_{k,j} \geq 0 \ \forall \ k, j. \quad (12)$$

The formula (10) for the optimization problem means maximization of a minimum user channel capacity among all users. By solving the optimization problem, the respective channel capacities can be made almost uniform over all the users, which is referred to as Fairness criteria herein.

The optimization problem can be solved based on an interior point method. According to this interior point method, a barrier function $g(P_{k,j})$ together with a barrier parameter $r(i)$ for adjusting values of the barrier function $g(P_{k,j})$ is added to the formula (10), and a new optimization problem for maximizing a function without constraints (11) and (12) is solved. Here, the parameter i represents the number of step iterations in the interior point method as discussed in detail below. Specifically, it starts with a greater barrier parameter, and the optimal transmit power $P_{k,j}$ is calculated for each barrier parameter. The calculated value is used as an initial value to iterate the process while decreasing the barrier parameter. In this manner, once the barrier parameter $r(i)$ reaches a sufficiently small value, the original constrained optimization problem can be solved. The new optimization problem with use of the barrier function and the barrier parameter can be represented as follows, $$\text{maximize } F = f + r(i)g(P_{k,j}), \quad (13)$$

$$f = \min_k C_k. \quad (14)$$

In the formulae (13) and (14), f is an exemplary original objective function associated with the constrained optimization problem on channel capacities for respective users. On the other hand, F is an exemplary objective function derived by adding the barrier function and the barrier parameter to the original objective function and serves as the objective function for the new optimization problem.

The barrier function $g(P_{k,j})$ includes transmit weights, transmit power limits and transmit power, and the barrier function $g(P_{k,j})$ as set forth below may be used.

$$g(P_{k,j}) = -\sum_{q=1}^{M_t}\left(P_{max,q} - \sum_{k=1}^{N}\sum_{j=1}^{M_r}|w_{k,q,j}|^2 P_{k,j}\right)^{-1} - \sum_{k=1}^{N}\sum_{j=1}^{M_r}(P_{k,j})^{-1} \quad (15)$$

In another example, the barrier function $g(P_{k,j})$ as presented below may be used.

$$g(P_{k,j}) = \sum_{q=1}^{M_t}\log\left(P_{max,q} - \sum_{k=1}^{N}\sum_{j=1}^{M_r}|w_{k,q,j}|^2 P_{k,j}\right) + \sum_{k=1}^{N}\sum_{j=1}^{M_r}\log(P_{k,j}) \quad (16)$$

[Initial Barrier Parameter Calculation Unit 21 in Optimal Transmit Power Calculation Unit 13]

Next, the initial barrier parameter calculation unit 21 as illustrated in FIG. 2 is described with reference to FIG. 3.

The initial temporary barrier parameter setup unit 31 sets an initial temporary barrier parameter r'(1). The initial temporary barrier parameter setup unit 31 sets the initial temporary barrier parameter r'(1) to an appropriate large value. The initial temporary barrier parameter setup unit 31 supplies the initial temporary barrier parameter r'(1) together with the incoming components $w_{k,q,j}$ and the eigenvalues $\lambda_{k,j}$ of the transmit weight matrix $W_k$ to the initial transmit power allocation setup unit 32.

The initial transmit power allocation setup unit 32 uses the information supplied from the initial temporary barrier parameter setup unit 31 to set initial transmit power $P_{k,j}$ initial corresponding to the optimization problem. Then, the initial transmit power allocation setup unit 32 supplies the initial transmit power $P_{k,j\ initial}$ together with the components $w_{k,q,j}$ and the eigenvalues $\lambda_{k,j}$ of the transmit weight matrix $W_k$ and the initial temporary barrier parameter r' (1) to the interior point method processing unit 33.

In order to calculate the initial transmit power $P_{k,j\ initial}$, a setup method depending on distribution of the eigenvalues $\lambda_{k,j}$ or a setup method using the transmit weight information as prior information may be applied. See the fourth article, for example. Also, any other appropriate initial transmit power setup method may be applied.

The interior point method processing unit 33 uses the components $w_{k,q,j}$ and the eigenvalues $\lambda_{k,j}$ of the transmit weight matrix $W_k$, the initial temporary barrier parameter r'(1) and the initial transmit power $P_{k,j\ initial}$ supplied from the initial transmit power allocation setup unit 32 to optimize the objective function F including the barrier function and the barrier parameter as represented in the formula (13). Then, the interior point method processing unit 33 supplies a value of the objective function f for the transmit power optimization problem as represented in the formula (14) together with the components $w_{k,q,j}$ and the eigenvalues $\lambda_{k,j}$ of the transmit weight matrix $W_k$, calculated $P_{k,j}$ and the barrier parameter r'(i) associated with termination of the step iterations in the interior point method to the interior point method termination determination unit 34. Also, the interior point method processing unit 33 supplies the value of the objective function f to the objective function value comparison unit 36. Here, represents an index of the number of step iterations in the interior point method.

Note that the operation of the interior point method processing unit 33 is similar to that of the interior point method processing unit 22 as stated below. Also, the interior point method processing unit 33 may supply a value of the objective function F including the barrier function and the barrier parameter instead of the objective function f to the objective function value comparison unit 36.

The interior point method termination determination unit 34 determines whether the number of step iterations in the interior point method is equal to 3. If the number of the step iterations is less than 3, the interior point method termination determination unit 34 supplies the components $w_{k,q,j}$ and the eigenvalues $\lambda_{k,j}$ of the transmit weight matrix $W_k$, the calculated $P_{k,j}$ and the barrier parameter r'(i) associated with the termination of the step iterations in the interior point method to the barrier parameter updating unit 35.

The barrier parameter updating unit 35 updates the barrier parameter in accordance with the formula (17) based on the components $w_{k,q,j}$ and the eigenvalues $\lambda_{k,j}$ of the transmit weight matrix $W_k$, the calculated $P_{k,j}$ and the barrier parameter r'(i) associated with the termination of the step iterations in the interior point method supplied from the interior point method termination determination unit 34, $$r'(i+1)=r'(i)\times\alpha \quad (17)$$

In the formula (17), $\alpha$ (<1) represents a barrier parameter scale factor. The barrier parameter updating unit 35 supplies again the barrier parameter r'(i+1) updated in accordance with the formula (17) together with the components $w_{k,q,j}$ and the eigenvalues $\lambda_{k,j}$ of the transmit weight matrix $W_k$ and the calculated $P_{k,j}$ to the interior point method processing unit 33, which performs the iteration.

On the other hand, if the number of step iterations in the interior point method reaches 3, the interior point method termination determination unit 34 supplies the components $w_{k,q,j}$ and the eigenvalues $\lambda_{k,j}$ of the transmit weight matrix $W_k$ and the barrier parameter r'(3) associated with termination of the three step iterations in the interior point method to the objective function value comparison unit 36.

Through the operations iterated in the interior point method processing unit 33, the interior point method termination determination unit 34 and the barrier parameter updating unit 35, three values of the objective function f, that is, f(i=1), f(i=2) and f(i=3), corresponding to the three step iterations in the interior point method, the components $w_{k,q,j}$ and the eigenvalues $\lambda_{k,j}$ of the transmit weight matrix $W_k$ and the barrier parameter r'(3) are supplied to the objective function value comparison unit 36.

Figure 4:
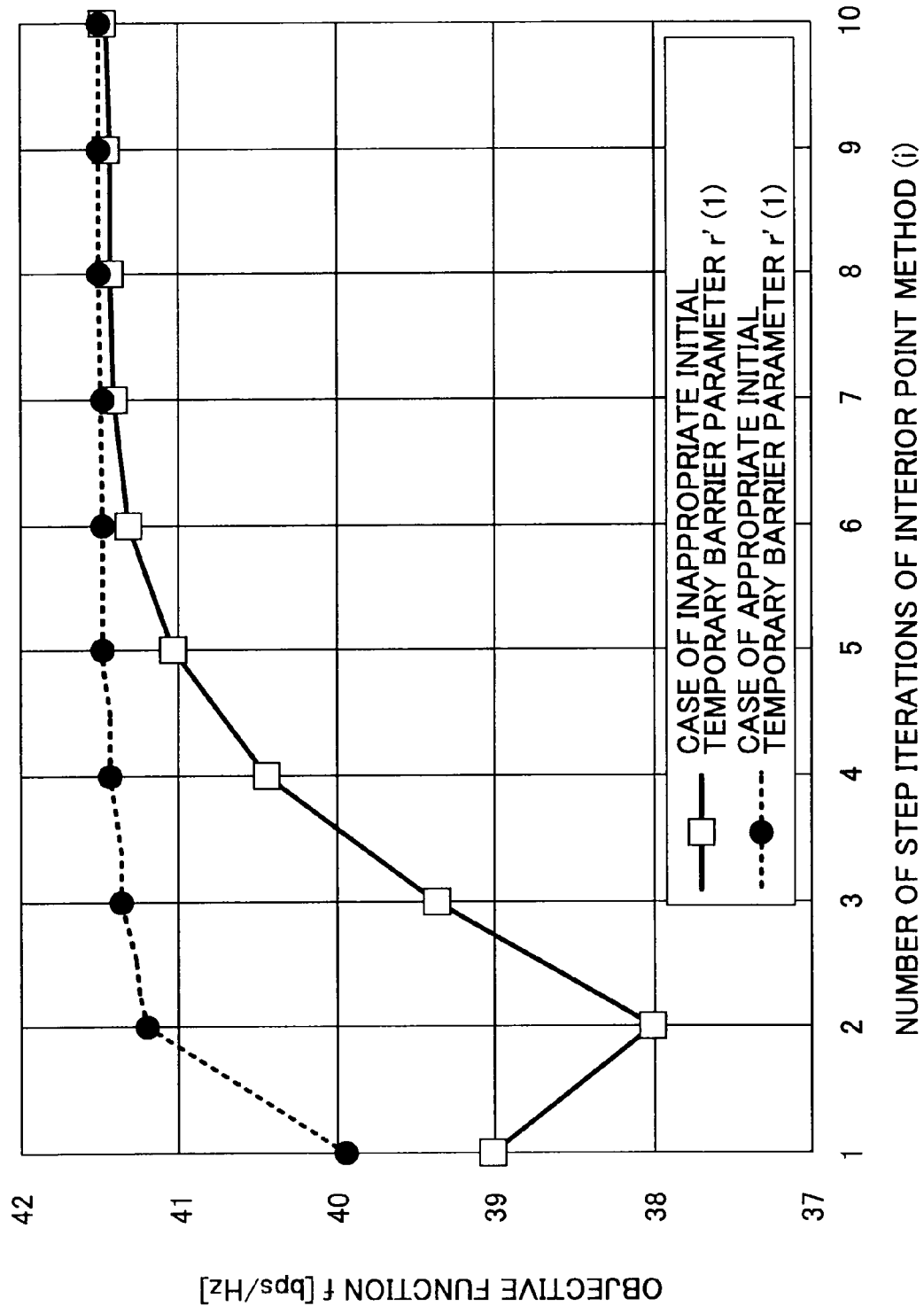
FIG. 4 schematically illustrates an exemplary relationship between the number of step iterations in the interior point method and an objective function in a radio communication apparatus according to one embodiment of the present invention.

FIG. 4 illustrates an exemplary relationship between the number of step iterations in the interior point method and the objective function. In FIG. 4, the solid line corresponds to the case where the initial temporary barrier parameter r'(i) is not appropriate, and the dotted line corresponds to the case where the initial temporary barrier parameter r'(i) is appropriate.

If the initial temporary barrier parameter r'(1) is not appropriate for the optimization problem and the initial transmit power allocation level is reasonably higher corresponding to the optimization problem, there may arise a reverse phenomenon on the values of the objective function f between the first step iteration and the second step iteration in the interior point method. In other words, if the initial temporary barrier parameter r'(1) is appropriate for the optimization problem as illustrated in the dotted line in FIG. 4, the objective function f may have gradually larger values from the first step iteration to the third step iteration in the interior point method. Accordingly, the objective function value comparison unit 36 could compare the incoming values of the objective function f corresponding to the three step iterations and determine whether the reverse phenomenon arises as illustrated in FIG. 4. For example, the objective function value comparison unit 36 may make this determination based on a discriminant as represented in the formula (18). If the discriminant is satisfied, the objective function value comparison unit 36 determines that the reverse phenomenon arises.

$$f(i=1) > f(i=2) < f(i=3) \quad (18)$$

If it is determined that the reverse phenomenon arises based on the determination using the discriminant in the formula (18), the step iteration must be performed in the interior point method until the reverse phenomenon disappears. For this reason, the objective function value comparison unit 36 resets the initial temporary barrier parameter r'(1) to the incoming r'(3) and also resets the index of step iterations in the interior point method to 1. Then, the reset index of step iterations is supplied to the initial transmit power allocation setup unit 32 again.

On the other hand, as a result of the comparison between the values of the objective function f corresponding to the three step iterations in the interior point method, if the objective function value comparison unit 36 determines that the reverse phenomenon does not arise as illustrated in the solid line in FIG. 4 based on the formula (18), the objective function value comparison unit 36 sets the incoming r'(3) as the initial barrier parameter r(1) suitable for the optimization problem and supplies r'(3) together with the components $w_{k,q,j}$ and the eigenvalues $\lambda_{k,j}$ of the transmit weight matrix $W_k$ to the initial transmit power allocation setup unit 37.

The initial transmit power allocation setup unit 37 uses the information supplied from the objective function value comparison unit 36 to reset the initial transmit power $P_{k,j\ initial}$ corresponding to the optimization problem. Then, the initial transmit power allocation setup unit 37 supplies the reset initial transmit power $P_{k,j}$ initial together with the components and the eigenvalues $\lambda_{k,j}$ of the transmit weight matrix $W_k$ and the initial barrier parameter r(1) to the interior point method processing unit 22.

In order to calculate the initial transmit power $P_{k,j\ initial}$, similar to the above-mentioned initial transmit power allocation setup unit 37, a setup method depending on distribution of the eigenvalues $\lambda_{k,j}$ or a setup method using the transmit weight information as the prior information may be applied. See the fourth article, for example. Also, any other appropriate setup method may be applied.

In the case where the interior point method processing unit 33 supplies the objective function F including the barrier function and the barrier parameter, the objective function value comparison unit 36 may use values of the objective function F for the comparison.

In the above-mentioned initial barrier parameter setup method, the objective function value comparison unit 36 uses the three values of the objective function f supplied from the interior point method processing unit 33 to set the initial barrier parameter r(1). In other embodiment, the objective function value comparison unit 36 may use three or more values of the objective function f to set the initial barrier parameter r(1). In this case, the formula (18) is adapted depending on the number of used values.

[Arrangement of Interior Point Method Processing Unit 22, 33 in Optimal Transmit Power Calculation Unit 13]

Figure 5:
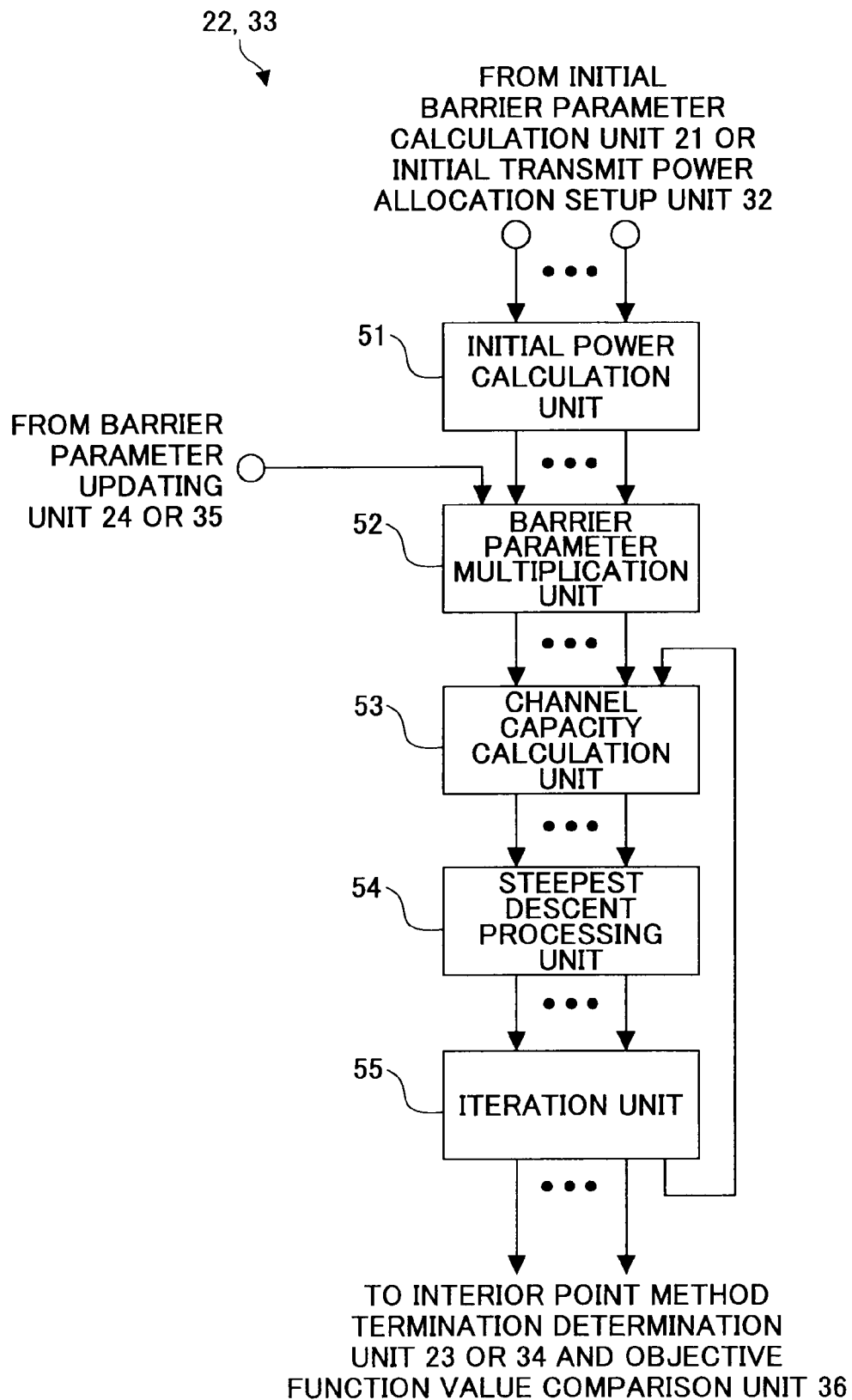
FIG. 5 is a partial block diagram of the radio communication apparatus according to one embodiment of the present invention.

FIG. 5 illustrates an exemplary arrangement of the interior point method processing unit 22, 33 in the radio communication apparatus 10 according to one embodiment of the present invention.

In this embodiment, a steepest descent method is utilized in the step iterations in the interior point method.

The interior point method processing unit 22, 33 includes an initial power calculation unit 51, a barrier parameter multiplication unit 52 coupled to the initial power calculation unit 51, a channel capacity calculation unit 53 coupled to the barrier parameter multiplication unit 52, a steepest descent processing unit 54 coupled to the channel capacity calculation unit 53 and an iteration unit 55 coupled to the steepest descent processing unit 54 and the channel capacity calculation unit 53.

[Arrangement of Iteration Unit 55 in Interior Point Method Processing Unit 22, 33]

Figure 6:
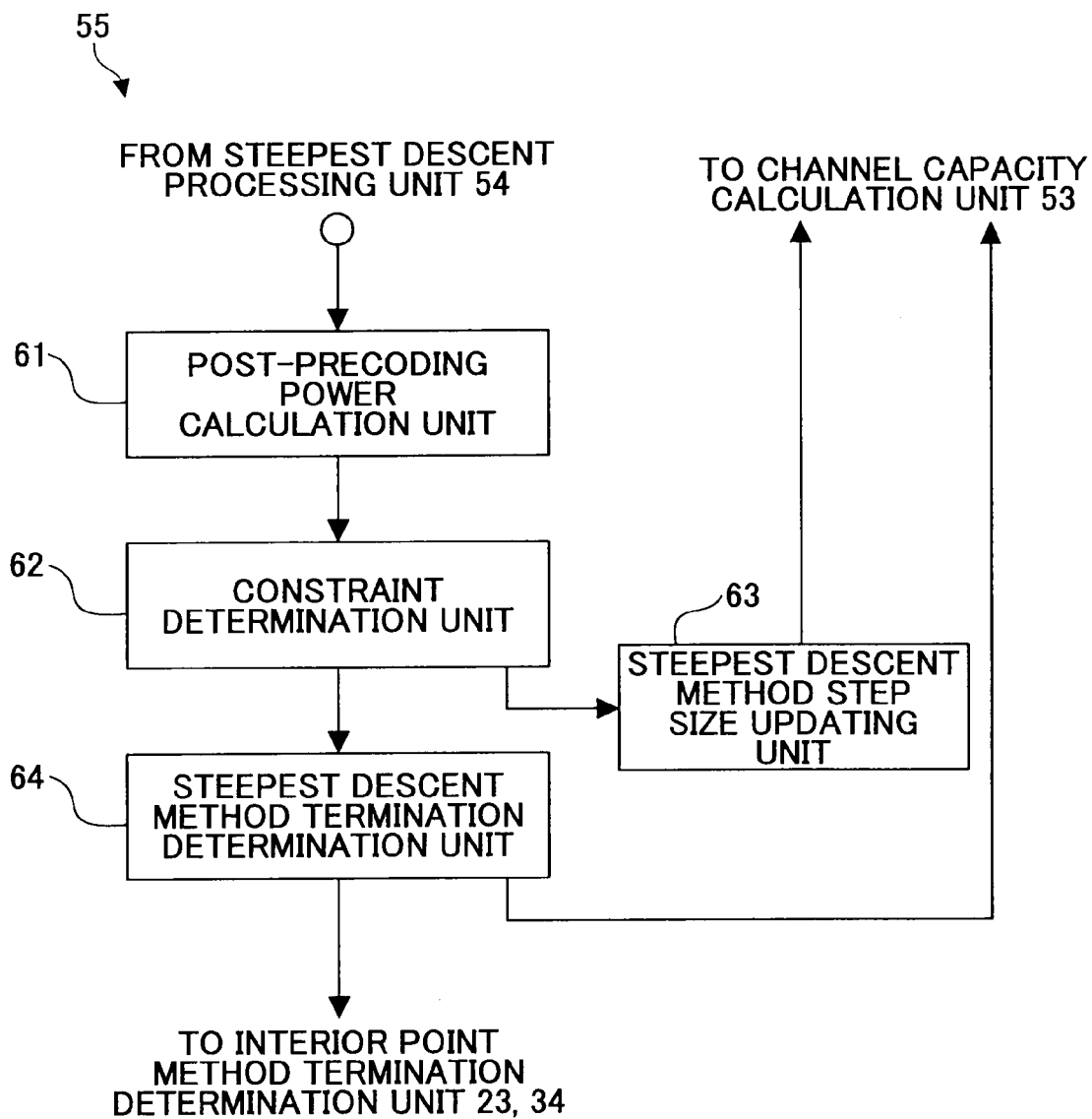
FIG. 6 is a partial block diagram of the radio communication apparatus according to one embodiment of the present invention.

FIG. 6 illustrates an exemplary arrangement of the iteration unit 55 according to one embodiment of the present invention.

The iteration unit 55 includes a post-precoding power calculation unit 61, a constraint determination unit 62 coupled to the post-precoding power calculation unit 61, a steepest descent method step size updating unit 63 coupled to the constraint determination unit 62 and a steepest descent method termination determination unit 64 coupled to the constraint determination unit 62.

[Operation of Iteration Unit 55]

A specific operation of the interior point method processing unit 22, 33 on optimization through the interior point method using the steepest descent method is described below.

The initial power calculation unit 51 in the interior point method processing unit 22, 33 uses the initial transmit power $P_{k,j\ initial}$ and the components $w_{k,q,j}$ and the eigenvalues $\lambda_{k,j}$ of the transmit weight matrix $W_k$ supplied from the initial barrier parameter calculation unit 21 and the initial transmit power allocation setup unit 32 to calculate initial transmit power $P_q$ for respective transmit antennas in accordance with the formula (19) for use in the interior point method processing unit 22, 33 and supplies the calculated transmit power $P_q$ to the barrier parameter multiplication unit 52, $$P_q = \sum_{k=1}^{N} \sum_{j=1}^{M_r} |w_{k,q,j}|^2 P_{k,j}, \quad (19)$$

where the transmit power $P_q$ is calculated by substituting the initial transmit power $P_{k,j\,initial}$ into the $P_{k,j}$ in the formula (19).

The barrier parameter multiplication unit 52 multiplies the barrier function with the barrier parameter r(i) supplied from the barrier parameter updating unit 24 or 35. The barrier parameter multiplication unit 52 supplies to the channel capacity calculation unit 53 the initial transmit power $P_{k,j\,initial}$, the components $w_{k,q,j}$ and the eigenvalues $\lambda_{k,j}$ of the transmit weight matrix $W_k$ and the initial transmit power $P_q$ supplied from the initial power calculation unit 51 as well as the transmit power $P_{k,j}$ supplied from the barrier parameter updating unit 24 or 35.

The channel capacity calculation unit 53 uses the components $w_{k,q,j}$ and the eigenvalues $\lambda_{k,j}$ of the transmit weight matrix $W_k$ supplied from the barrier parameter multiplication unit 52 as well as the initial transmit power $P_{k,j\,initial}$ supplied from the barrier parameter multiplication unit 52 or the transmit power $P_{k,j}$ supplied from the barrier parameter multiplication unit 52 or the steepest descent method termination determination unit 64 in the iteration unit 55 to calculate channel capacities $C_k$ for the respective users in accordance with the above-mentioned formula (9). The channel capacity calculation unit 53 supplies the channel capacities $C_k$ for the respective users together with the components $w_{k,q,j}$ and the eigenvalues $\lambda_{k,j}$ of the transmit weight matrix $W_k$ to the steepest descent processing unit 54.

The steepest descent processing unit 54 optimizes the formula (13) associated with the optimization problem using the barrier function in accordance with the steepest descent method. The steepest descent method herein is one method for optimization using gradient information in the formula (13). Specifically, iterative operations as defined below are conducted in the steepest descent method, $$P_{k,j}(u+1) = P_{k,j}(u) + \beta \times \frac{\partial}{\partial P_{k,j}} F, \quad (20)$$

where the parameter u represents the number of conducted iterations, and the parameter $\beta$ represents a step size.

The steepest descent processing unit 54 supplies the optimized transmit power $P_{k,j}$ together with the components $w_{k,q,j}$ and the eigenvalues $\lambda_{k,j}$ of the transmit weight matrix $W_k$ to the iteration unit 55.

An exemplary operation of the iteration unit 55 is described with reference to FIG. 6.

The post-precoding power calculation unit 61 calculates the transmit power $P_q$ for the respective transmit antennas based on the optimized transmit power $P_{k,j}$ and the components $w_{k,q,j}$ of the transmit weight matrix $W_k$ supplied from the steepest descent processing unit 54. The post-precoding power calculation unit 61 may calculate the transmit power $P_q$ for the respective transmit antennas in accordance with the formula (19), for example. The post-precoding power calculation unit 61 supplies the transmit power $P_q$ for the respective transmit antennas to the constraint determination unit 62.

The constraint determination unit 62 determines whether conditions in the formula (21) as presented below are satisfied. In other words, the constraint determination unit 62 determines whether the transmit power $P_q$ is lower than or equal to the power limit $P_{max,q}$ for the respective transmit antennas and whether the optimized transmit power $P_{k,j}$ is higher than or equal to 0.

$$\begin{cases} P_q \leq P_{max,q} \\ P_{k,j} \geq 0 \end{cases} \quad (21)$$

If any of the conditions in the formulae (21) is not satisfied, the constraint determination unit 62 notifies the steepest descent method step size updating unit 63 that the condition is not satisfied.

Based on the notification from the constraint determination unit 62, the steepest descent method step size updating unit 63 decreases the step size $\beta$ and returns it to the channel capacity calculation unit 53. The channel capacity calculation unit 53 performs the operation as stated above and supplies the step size $\beta$ and the channel capacities $C_k$ for the respective users together with the components $w_{k,q,j}$ and the eigenvalues $\lambda_{k,j}$ of the transmit weight matrix $W_k$ to the steepest descent processing unit 54.

The steepest descent processing unit 54 uses the step size $\beta$ supplied from the channel capacity calculation unit 53 to perform the iteration as specified in the formula (20). The post-precoding power calculation unit 61 calculates the transmit power $P_q$ for the respective transmit antennas based on the optimized transmit power $P_{k,j}$ and the components $w_{k,q,j}$ of the transmit weight matrix $W_k$ supplied from steepest descent processing unit 54. The post-precoding power calculation unit 61 supplies the transmit power $P_q$ to the constraint determination unit 62.

The constraint determination unit 62 determines whether the conditions in the above-mentioned formula (21) are satisfied. The above operation is iterated until the conditions are satisfied.

If the conditions are satisfied, the constraint determination unit 62 supplies the transmit power $P_{k,j}$ to the steepest descent method termination determination unit 64.

The steepest descent method termination determination unit 64 determines whether termination conditions as specified in the formula (22) are satisfied based on the transmit power $P_{k,j}$ supplied from the constraint determination unit 62, $$\begin{cases} \left\| \frac{\partial}{\partial P_{k,j}} F(u) \right\| = \left( \sum_{k=1}^{N} \sum_{j=1}^{M_r} \left| \frac{\partial}{\partial P_{k,j}} F(u) \right|^2 \right)^{1/2} < \varepsilon_1 \\ \left| \min_k C_k(u) - \min_k C_k(u-1) \right| < \varepsilon_2 \\ u > I_{max} \end{cases} \quad (22)$$

where $$C_k = \sum_{j=1}^{M_r} \log_2(1 + SNR_{k,j}). \quad (23)$$

In the formula (22), the parameter u represents the number of iterations in the steepest descent method, and the parameter $I_{max}$ represents the maximum numbers of iterations. Also, the parameters $\varepsilon_1$ and $\varepsilon_2$ are sufficiently small values. In other words, if a derived variation of the objective function to a variation of the transmit power is within a predefined sufficiently small value, if a variation of the original objective function to an increment of the number of iterations is within a predefined sufficiently small value, and/or if the number of iterations exceeds a predefined threshold, the step iterations in the steepest descent method is terminated.

Note that the above termination conditions are illustrative for the steepest descent method and any other termination conditions may be used. Also, the parameters $I_{max}$, $\epsilon_1$ and $\epsilon_2$ may be set in the interior point method processing unit 22, 33 independently. In addition, since values of the objective function f supplied from the interior point method processing unit 33 are used only in the comparison in the formula (18) by the objective function value comparison unit 36, the maximum number of iterations $I_{max}$ in the steepest descent method in the interior point method processing unit 33 may be set to a minimum value such that the formula (24) is not satisfied. In other words, the maximum number of iterations $I_{max}$ may be adaptively set depending on the values of the objective function f such that the formula (24) is not satisfied.

$$f(i=1) > f(i=2) > f(i=3) < f(i=4) \quad (24)$$

If neither of the conditions in the formula (22) is satisfied, the steepest descent method termination determination unit 64 supplies the transmit power $P_{k,j}$ to the channel capacity calculation unit 53. If the transmit power $P_{k,j}$ is supplied to the channel capacity calculation unit 53, the above-mentioned operation is performed again. This operation is iterated until the steepest descent method termination determination unit 64 determines that any of the conditions in the formula (22) is satisfied.

On the other hand, if any of the conditions in the formula (22) is satisfied, the steepest descent method termination determination unit 64 supplies the transmit power $P_{k,j}$ as an output of the interior point method processing unit 22, 33. Specifically, the transmit power $P_{k,j}$ being the output of the interior point method processing unit 22 is supplied to the interior point method termination determination unit 23 while the transmit power $P_{k,j}$ being the output of the interior point method processing unit 33 is supplied to the interior point method termination determination unit 34 and the objective function value comparison unit 36.

[Operation of Interior Point Method Termination Determination Unit 23 and Barrier Parameter Updating Unit 24 in Optimal Transmit Power Calculation Unit 13]

Next, the interior point method termination determination unit 23 and the barrier parameter updating unit 24 as illustrated in FIG. 2 are described.

The interior point method termination determination unit 23 determines whether step iteration termination conditions in the interior point method as specified in the formula (25) are satisfied, $$\begin{cases} r(i) < \varepsilon_3 \\ \dfrac{\left| \min_k C_k(i) - \min_k C_k(i-1) \right|}{\min_k C_k(i)} < \varepsilon_4 \end{cases} \quad (25)$$

where the parameter i represents the number of step iterations in the interior point method. Also, the parameters $\epsilon_3$ and $\epsilon_4$ are sufficiently small values. In other words, if the barrier parameter is smaller than the predefined sufficiently small value and/or if a variation of the original objective function to an increment of the number of iterations is within the predefined sufficiently small value, the step iterations in the interior point method are terminated.

Note that the above step iteration termination conditions are illustrative for the interior point method and any other termination conditions may be used. Also, the parameters $\epsilon_3$ and $\epsilon 4$ may be set in the interior point method processing unit 22, 33 independently.

If neither of the termination conditions in the formula (25) is satisfied, the interior point method termination determination unit 23 determines the transmit power $P_{k,j}$ as an optimal solution for the barrier parameter r(i) and supplies the transmit power $P_{k,j}$ to the barrier parameter updating unit 24.

The barrier parameter updating unit 24 updates the barrier parameter with a smaller value in accordance with the formula (17). Then, the barrier parameter updating unit 24 supplies the barrier parameter r(i) together with the transmit power $P_{k,j}$ to the interior point method processing unit 22 again. The interior point method processing unit 22 performs the above-mentioned operation. In application of the formula (17), r'(i) is replaced with r(i) in the formula (17).

On the other hand, if any of the termination conditions in the formula (25) is satisfied, the interior point method termination determination unit 23 supplies the transmit power $P_{k,j}$ upon the satisfaction as an optimal solution for the interior point method processing unit 22 to the transmit signal control unit 14.

[Operation of Radio Communication Apparatus 10]

Figure 7:
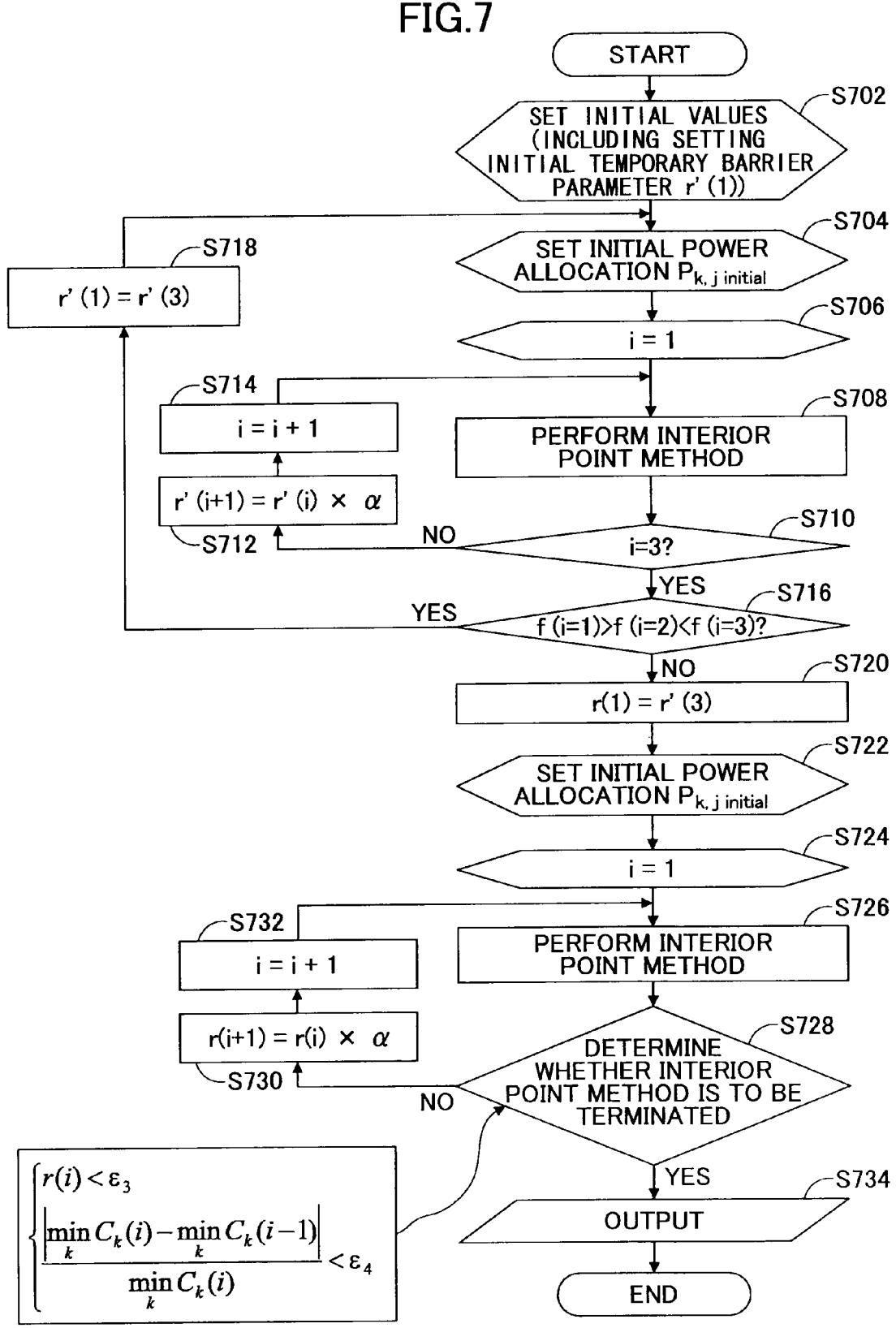
FIG. 7 is a flowchart illustrating an operation of the radio communication apparatus according to one embodiment of the present invention.

FIG. 7 is a flowchart illustrating an exemplary operation of the radio communication apparatus 10 according to one embodiment of the present invention. In this embodiment, operations of the optimal transmit power calculation unit 13 are focused on.

At step S702, the optimal transmit power calculation unit 13 sets the initial temporary barrier parameter r' (1), the maximum number iterations $I_{max}$ in the steepest descent method and the parameters $\epsilon_1$ to $\epsilon_4$. Specifically, the initial temporary barrier parameter setup unit 31 sets the initial temporary barrier parameter r' (1). The steepest descent method termination determination unit 64 sets the maximum number iterations $I_{max}$ and the parameters $\epsilon_1$ to $\epsilon_2$ in the steepest descent method. The interior point method termination determination unit 23 sets the parameters $\epsilon_3$ to $\epsilon_4$.

At step S704, the optimal transmit power calculation unit 13 sets the initial transmit power allocation level $P_{k,j\ initial}$. Specifically, the initial transmit power allocation setup unit 32 sets the initial transmit power allocation level $P_{k,j\ initial}$.

At step S706, the optimal transmit power calculation unit 13 sets the index i for the number of step iterations in the interior point method to 1. Specifically, the interior point method processing unit 33 the index i for the number of step iterations in the interior point method to 1.

At step S708, the optimal transmit power calculation unit 13 performs the interior point method to calculate a value of the objective function f for the transmit power optimization problem. Specifically, the interior point method processing unit 33 calculates the value of the objective function f for the transmit power optimization problem.

At step S710, the optimal transmit power calculation unit 13 refers to the index i to determine whether the index i is less than 3. Specifically, the interior point method termination determination unit 34 refers to the index i to determine whether i is less than 3.

If the index i is less than 3 (S710: NO), at step S712, the optimal transmit power calculation unit 13 updates the temporary barrier parameter r'(1) with a smaller value in accordance with the formula (17). Specifically, the barrier parameter updating unit 35 updates the temporary barrier parameter r'(1) with the smaller value.

At step S714, the optimal transmit power calculation unit 13 increments the index i by 1. Specifically, the interior point method processing unit 33 increments the index i by 1. Then, the flow returns to step S708. At step S708, the interior point method processing unit 33 performs the step iteration in the interior point method again based on the $P_{k,j}$ and r'(i).

On the other hand, if the index i is equal to 3 (S710: YES), at step S716, the optimal transmit power calculation unit 13 uses the objective functions f(i=1), f(i=2) and f(i=3) calculated at step S708 to determine whether a reverse phenomenon arises for the objective function values based on the discriminant as represented in the formula (18). Specifically, the objective function value comparison unit 36 determines whether the reverse phenomenon arises for the objective function values.

If it is determined that the reverse phenomenon arises for the objective function values (S716: YES), at step S718, the optimal transmit power calculation unit 13 resets the initial temporary barrier parameter r'(1) to the barrier parameter r'(3) upon termination of the third step iteration in the interior point method. Then, the flow returns to step S704. Specifically, the objective function value comparison unit 36 resets the initial temporary barrier parameter r'(1) to the barrier parameter r'(3).

On the other hand, if it is not determined that the reverse phenomenon arises for the objective function values (S716: NO), at step S720, the optimal transmit power calculation unit 13 sets the barrier parameter r'(3) upon the termination of the third iteration in the interior point method to the initial barrier parameter r(1). Specifically, the objective function value comparison unit 36 sets the barrier parameter r'(3) to the initial barrier parameter r(1).

In the illustrated flowchart, the objective function f is calculated at step S708 in the transmit power optimization problem, but in other embodiments, the objective function F for the interior point method in the formula (13) may be calculated. In this case, the determination at step S716 may be made based on the objective function F.

At step S722, the optimal transmit power calculation unit 13 resets the initial transmit power allocation level $P_{k,j\ initial}$. Specifically, the initial transmit power allocation setup unit 37 resets the initial transmit power allocation level $P_{k,j\ initial}$ corresponding to the optimization problem.

At step S724, the optimal transmit power calculation unit 13 sets the index i for the number of step iterations in the interior point method to 1. Specifically, the interior point method processing unit 22 sets the index i to 1.

At step S726, the optimal transmit power calculation unit 13 performs the interior point method to optimize the transmit power at the index i and then calculates the transmit power $P_{k,j}$, the barrier parameter r(i) and the objective function F or f for the transmit power optimization problem as represented in the formula (13).

In the illustrated flowchart, the initial values for use in the steepest decent method and the interior point method are set at steps S702, S704 and S722, but in other embodiments, it is desirable that parameters suitable for applied optimization schemes and termination conditions be set.

At step S728, the optimal transmit power calculation unit 13 determines whether the step iteration termination conditions as represented in the formula (25) are satisfied. Specifically, the interior point method termination determination unit 23 determines whether the step iteration termination conditions are satisfied.

If neither of the termination conditions in the formula (25) is satisfied (S728: NO), at step S730, the optimal transmit power calculation unit 13 determines the unsatisfied transmit power $P_{k,j}$ as an optimal solution for the barrier parameter r(i) and updates the barrier parameter with a smaller value in accordance with the formula (17). At step S732, the optimal transmit power calculation unit 13 increments the index i by 1. Then, the flow returns to step S726.

Specifically, if neither of the termination conditions is satisfied, the interior point method termination determination unit 23 determines the unsatisfied transmit power $P_{k,j}$ as the optimal solution for the barrier parameter r(i). Then, the barrier parameter updating unit 24 updates the barrier parameter with the smaller value in accordance with the formula (17). The interior point method processing unit 22 increments the index i by 1. The interior point method processing unit 22 performs the step iterations in the interior point method again based on the $P_{k,j}$ and r(i).

When the formula (17) is applied at step S730, the calculation is made by replacing r'(i) with r(i) in the formula (17).

On the other hand, if any of the termination conditions as represented in the formula (25) is satisfied (S728: YES), the transmit power $P_{k,j}$ at the satisfaction time is supplied to the transmit signal control unit 14 as the optimal solution of the optimal transmit power calculation unit 13. If any of the termination conditions in the formula (25) is satisfied, the interior point method termination determination unit 23 supplies the satisfied transmit power $P_{k,j}$ to the transmit signal control unit 14 as the optimal solution of the interior point method processing unit 22.

[Operation of the Interior Point Method Processing Unit 22, 33]

Figure 8:
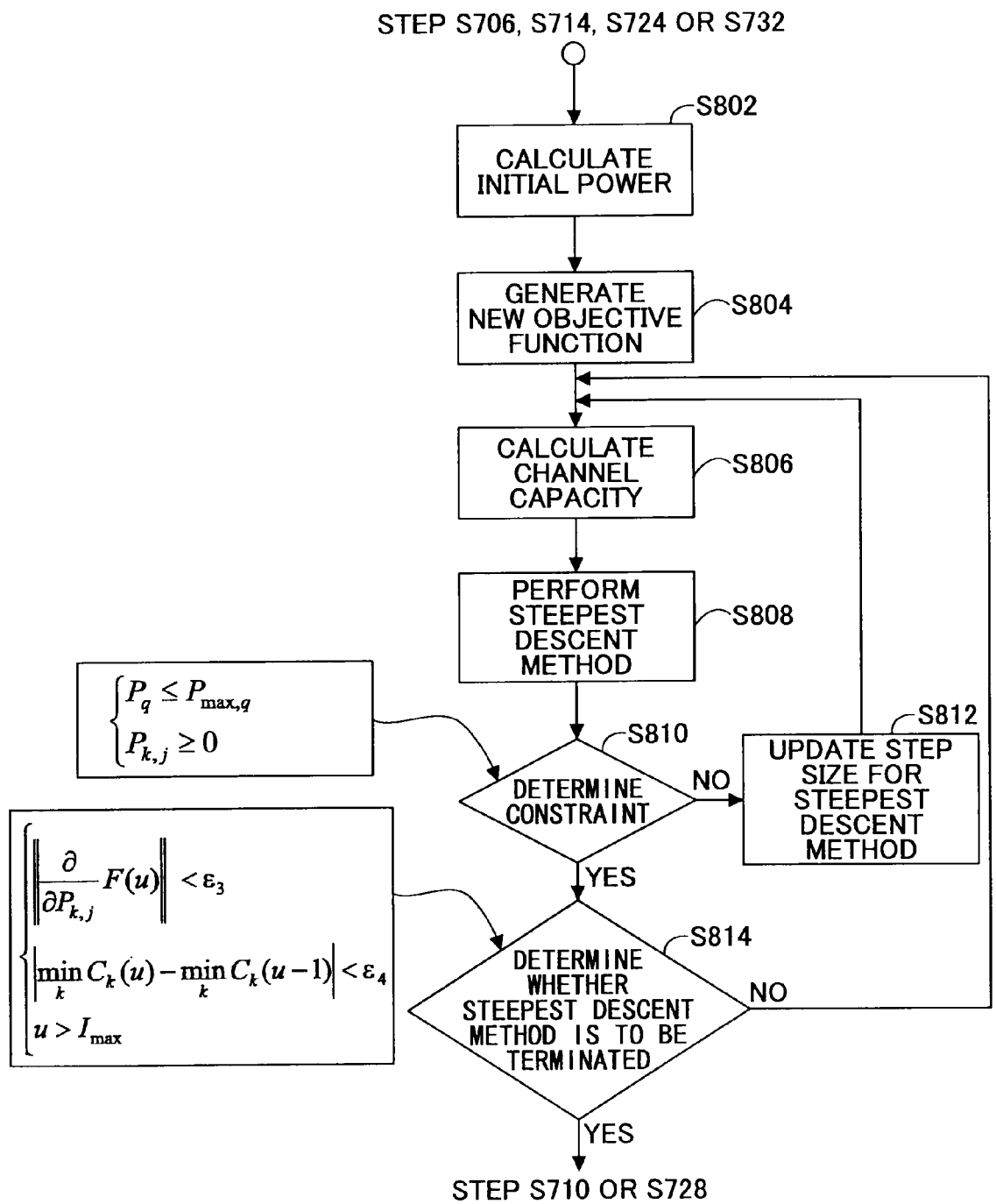
FIG. 8 is a flowchart illustrating an operation of the radio communication apparatus according to one embodiment of the present invention.

FIG. 8 is a flowchart illustrating an exemplary operation of the interior point method processing unit 22, 33 in the optimization using the steepest descent method according to one embodiment of the present invention. Specifically, the optimization is conducted using the steepest descent method at steps S708 and S726 in FIG. 7.

At step S802, the interior point method processing unit 22 calculates the transmit power $P_q$ for each transmit antenna. Specifically, the initial power calculation unit 51 calculates the transmit power $P_q$ for each transmit antenna in accordance with the formula (19).

At step S804, the interior point method processing unit 22 multiplies the barrier parameter r(i) with the barrier function $g(P_{k,j})$ to generate the objective function F for a new optimization problem. Specifically, the barrier parameter multiplication unit 52 multiplies the barrier parameter r(i) with the barrier function $g(P_{k,j})$.

At step S806, the interior point method processing unit 22 calculates channel capacities for respective users. Specifically, the channel capacity calculation unit 53 uses the components $w_{k,q,j}$ and the eigenvalues $\lambda_{k,j}$ of the transmit weight matrix $W_k$ and the transmit power $P_{k,j}$ to calculate the channel capacities $C_k$ for the respective users in accordance with the formula (9).

At step S808, the interior point method processing unit 22 calculates a gradient of the objective function F, that is, a differential value, and then calculates new $P_{k,j}$ in accordance with the formula (20). The steepest descent processing unit 54 optimizes the formula (13) for the optimization problem using the above-mentioned barrier function in accordance with the steepest descent method.

At step S810, the interior point method processing unit 22 calculates the transmit power $P_q$ for each transmit antenna in accordance with the formula (19) and determines whether the conditions in the formula (21) are satisfied. The post-precoding power calculation unit 61 calculates the transmit power $P_q$ for each transmit antenna based on the optimized transmit power $P_{k,j}$ and the components of the transmit weight matrix $W_k$. The constraint determination unit 62 determines whether the conditions in the formula (21) are satisfied.

If any of the conditions is not satisfied (S810: NO), at step S812, the interior point method processing unit 22 updates the step size β to a smaller value. Then, the flow returns to step S806. The above operation is iterated until all the conditions are satisfied at step S810. If any of the conditions in the formula (21) is not satisfied, the constraint determination unit 62 notifies the steepest descent method step size updating unit 63 that the conditions are not satisfied. The steepest descent method step size updating unit 63 updates the step size β to the smaller value based on the notification by the constraint determination unit 62.

On the other hand, if all the conditions are satisfied (S810: YES), at step S814, the interior point method processing unit 22 determines whether the steepest descent method termination conditions in the formula (22) are satisfied. The steepest descent method termination determination unit 64 determines whether the steepest descent method termination conditions in the formula (22) are satisfied based on the transmit power $P_{k,j}$.

If neither of the termination conditions in the formula (22) is satisfied (S814: NO), the flow returns to step S806. The interior point method processing unit 22 iterates the above operation until any of the conditions in the formula (22) is satisfied at step S814.

On the other hand, if any of the termination conditions in the formula (22) is satisfied (S814: YES), the steepest descent method termination determination unit 64 supplies the satisfied transmit power $P_{k,j}$ as the optimal value of the steepest descent method. Specifically, if any of the termination conditions in the formula (22) is satisfied, the steepest descent method termination determination unit 64 supplies the transmit power $P_{k,j}$ as an output of the interior point method processing unit 22, 33.

In the illustrated flowchart, the optimization using the steepest descent method is conducted as one example of the interior point method, but in other embodiments, any other appropriate optimization scheme may be utilized for the interior point method. Also in this case, in accordance with the arrangement illustrated in FIG. 2 and the flowchart illustrated in FIG. 7, output values are stored for individual steps in the interior point method, and the initial barrier parameters can be iteratively set through the comparison of the output values.

In the above optimization scheme, the optimization problem is solved to make the channel capacities $C_k$ for respective users uniform. In other embodiments, the optimization problem may be solved to maximize the overall system channel capacity C. The optimization problem on the maximization of the overall system channel capacity C is described below.

$$\text{maximize} \, C = \sum_{k=1}^{N} \sum_{j=1}^{M_r} \log_2(1 + SNR_{k,j}) \quad (26)$$

$$\text{s.t.} \sum_{k=1}^{N} \sum_{j=1}^{M_r} |w_{k,q,j}|^2 P_{k,j} \leq P_{max,q} \quad (27)$$

$$P_{k,j} \geq 0 \; \forall \, k, j \quad (28)$$

The optimization problem on the maximization of the overall system channel capacity C is referred to as Sum-rate criteria. The corresponding solution is the same as that of the Fairness criteria.

In the above-mentioned embodiments, each transmit antenna has a power limit $P_{max,q}$. Also in a case where the transmit antennas are grouped and the power limits are set to the respective groups, the present optimization scheme is applicable.

Figure 9:
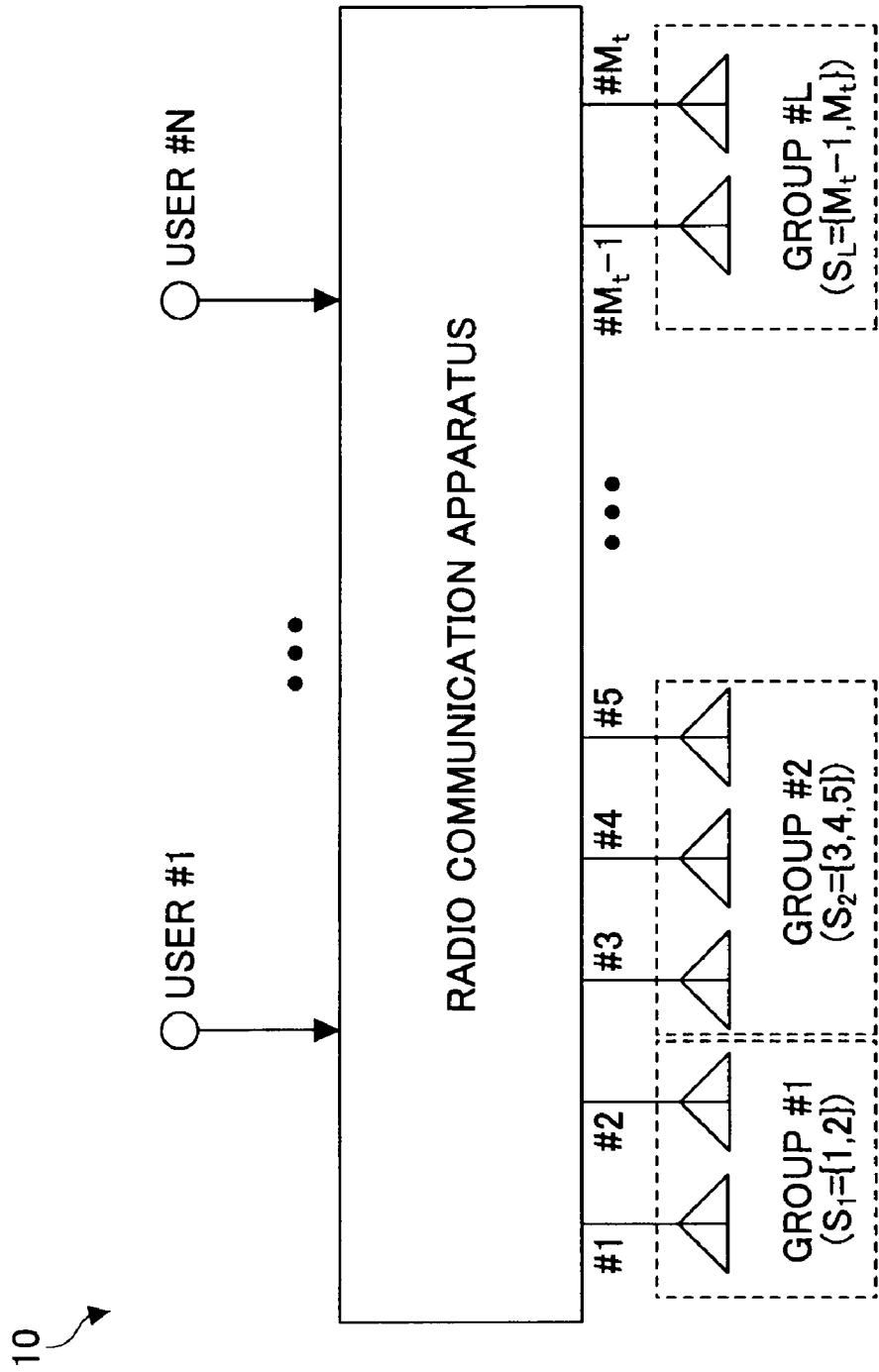
FIG. 9 schematically illustrates that multiple transmit antennas are grouped in the radio communication apparatus according to one embodiment of the present invention.
Figure 10:
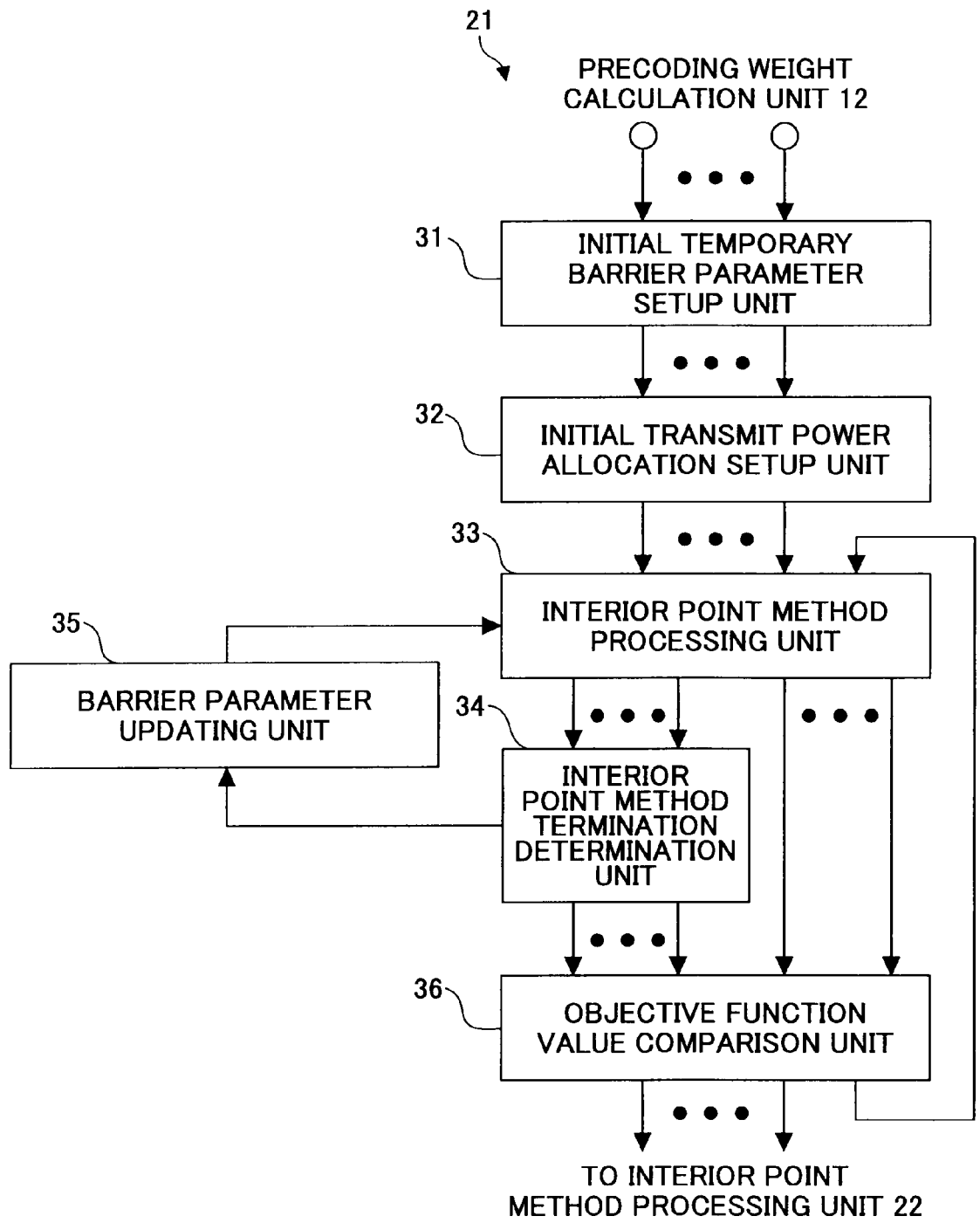
FIG. 10 is a partial block diagram of the radio communication apparatus according to one embodiment of the present invention.

FIG. 9 schematically illustrates the radio communication apparatus 10 in the case where the transmit antennas are grouped and the power limits are set to the respective groups. In FIG. 9, L represents the number of groups ($1 \leq l \leq L$), and $S_l$ represents a collection of transmit antenna numbers belonging to group 1.

The Fairness criteria based optimization problem corresponding to the case illustrated in FIG. 9 is formulated below.

$$\text{maximize} \, \min_k C_k = \min_k \sum_{j=1}^{M_r} \log_2(1 + SNR_{k,j}) \quad (29)$$

$$\text{s.t.} \sum_{q \in S_l} \left[ \sum_{k=1}^{N} \sum_{j=1}^{M_r} |w_{k,q,j}|^2 P_{k,j} \right] \leq P_{max,l} \quad (30)$$

$$P_{k,j} \geq 0 \; \forall \, k, j \quad (31)$$

where $P_{max,1}$ represents a power limit for group 1. The optimization problem as formulated in the formulae (29)-(31) can be solved similar to the above-mentioned solution scheme. Also in the Sum-rate criteria, the optimization problem can be similarly derived.

In the above-mentioned embodiments, the BD-ZF scheme is applied to the precoding, but any other precoding scheme can be applied to the transmit power optimization problem.

Second Embodiment

Arrangement of Radio Communication Apparatus

A radio communication apparatus according to this embodiment is described. The radio communication apparatus 10 is the same as that in FIG. 1 except that the initial barrier parameter calculation unit 21 performs an operation different from that of the first embodiment. According to the first embodiment, for every three interior point method step iterations for calculating the initial barrier parameter, the initial transmit power allocation setup unit 37 uses information supplied from the objective function value comparison unit 36 to set new initial transmit power $P_{k,j \, initial}$ corresponding to the optimization problem.

In this embodiment, on the other hand, the initial transmit power $P_{k,j \, initial}$ is set only once. The transmit power levels $P_{k,j}$ supplied for each of the interior point method step iterations for calculating the initial barrier parameter are used as the initial transmit power for the next iteration and the initial transmit power for the interior point method processing unit 22.

[Arrangement of Initial Barrier Parameter Calculation Unit 21]

The initial barrier parameter calculation unit 21 includes an initial temporary barrier parameter setup unit 31, an initial transmit power allocation setup unit 32 coupled to the initial temporary barrier parameter setup unit 31, an interior point method processing unit 33 coupled to the initial temporary transmit power allocation setup unit 32, a barrier parameter updating unit 35 coupled to the interior point method processing unit 33, an interior point method termination determination unit 34 coupled to the barrier parameter updating unit 35 and the interior point method processing unit 33 and an objective function value comparison unit 36 coupled to the interior point method termination determination unit 34 and the interior point method processing unit 33.

[Initial Barrier Parameter Calculation Unit 21]

A difference of operations of the initial barrier parameter calculation unit 21 between the first embodiment and the second embodiment is described.

In this embodiment, the interior point method processing unit 33 supplies a value of the objective function f and $P_{k,j}$ calculated in the interior point method step iteration to the objective function value comparison unit 36.

In this embodiment, if it is determined that a reverse phenomenon arises based on the formula (18), the objective function value comparison unit 36 resets the initial temporary barrier parameter r'(1) to r'(3) supplied from the interior point method termination determination unit 34 and then supplies the reset initial temporary barrier parameter together with the calculated transmit power $P_{k,j}$ and the components $w_{k,q,j}$ and the eigenvalues $\lambda_{k,j}$ of the transmit weight matrix $W_k$ to the interior point method processing unit 33 again.

In this embodiment, if it is determined that the reverse phenomenon does not arise based on the formula (18), the objective function value comparison unit 36 resets r' (3) supplied from the interior point method termination determination unit 34 to the initial barrier parameter r(1) suitable for the optimization problem and supplies the reset initial barrier parameter together with the calculated transmit power $P_{k,j}$ and the components $w_{k,q,j}$ and the eigenvalues $\lambda_{k,j}$ of the transmit weight matrix $W_k$ to the interior point method processing unit 33.

The other operations are similar to the first embodiment.

[Operation of Radio Communication Apparatus 10]

Figure 11:
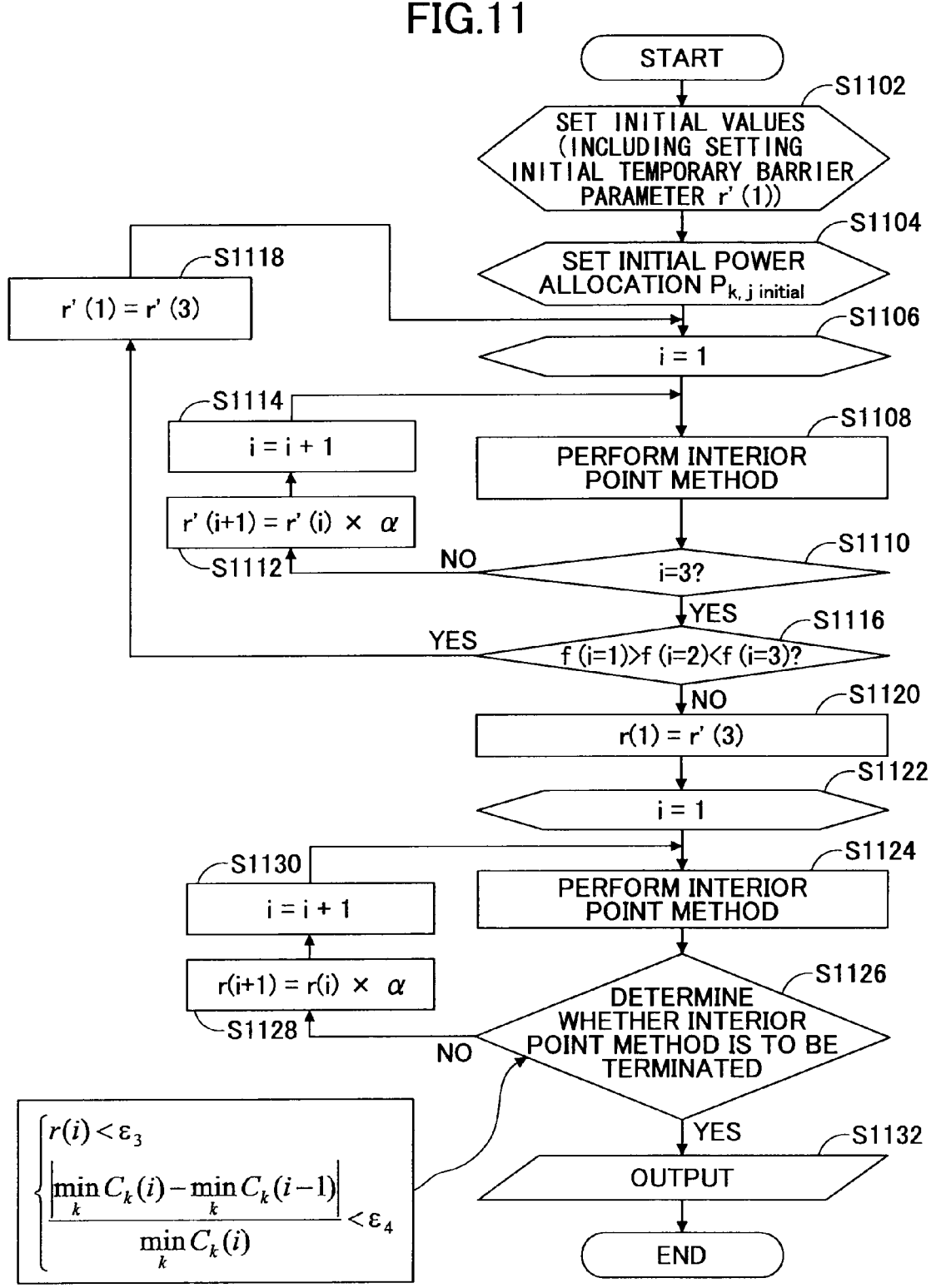
FIG. 11 is a flowchart illustrating an operation of the radio communication apparatus according to one embodiment of the present invention.

FIG. 11 is a flowchart illustrating an exemplary operation of the radio communication apparatus 10 according to one embodiment of the present invention. In this embodiment, an operation of the optimal transmit power calculation unit 13 is described.

Steps S1102-S1120 of the present embodiment is the same as steps S702-S720 of the first embodiment except that the flow returns to step S1106 after running step S1118. Also, steps S1122-S1132 of the present embodiment is the same as steps S724-S734 of the first embodiment.

Third Embodiment

A radio communication apparatus 10 according to this embodiment is described. It is assumed that the radio communication apparatus 10 according to the first and second embodiments includes multiple transmit antennas. The radio communication apparatus 100 according to the third embodiment is coupled to the multiple transmit antennas in a wired or wireless manner. The multiple transmit antennas may reside separately from the radio communication apparatus 10.

[Arrangement of Radio Communication Apparatus 10]

Figure 12:
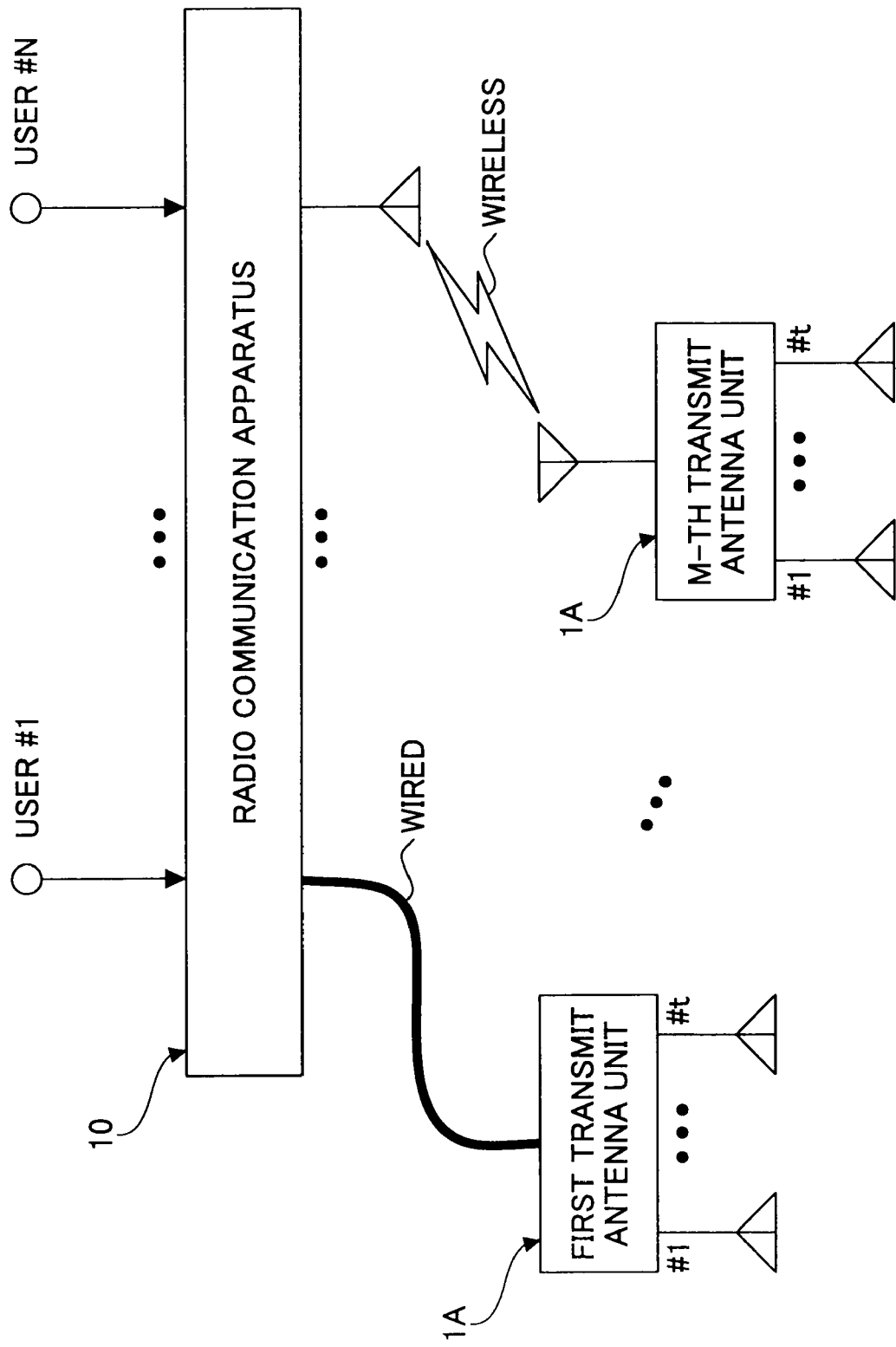
FIG. 12 schematically illustrates a radio communication apparatus according to one embodiment of the present invention.

FIG. 12 schematically illustrates an exemplary radio communication apparatus 10 according to the present embodiment.

The radio communication apparatus 10 is coupled to a transmit antenna unit 1A including multiple transmit antennas in a wired or wireless manner.

The radio communication apparatus 10 operates similar to those of the first and second embodiments except that the multiple transmit antenna units 1A are disposed separately from the radio communication apparatus 10.

[Characteristics of Radio Communication Apparatus 10]

Effectiveness of the above-mentioned radio communication apparatus according to the first embodiment is described.

In order to determine the effectiveness of the radio communication apparatus 10, computer simulations were conducted under the case where the BD-ZF scheme was utilized for precoding and the same power limit $P_{max}$ was set for respective transmit antennas.

In FIG. 13, the case where the initial barrier parameter was uniquely determined was illustrated for comparison. The barrier function associated with the formula (15) was utilized. Also, in the simulations, the number of transmit antennas $M_t$ was set to 6, the number of users N was set to 3, the number of user antennas $M_r$ was set to 2, and two streams were spatially multiplexed and transmitted for each user. As to the channel environment, it was assumed that MIMO channels for the respective users were in independent Rayleigh fading. One thousand independent MIMO channel matrices were used to solve the transmit power optimization problem, and an average of the number of iterations required for convergence of the optimization problem and an average convergence value were evaluated.

A formula for $P_{k,j}$ initial according to the first embodiment as set forth was used corresponding to the solved optimization problem with reference to the fourth article, $$P_{k,j\ initial} = \min_q \left[ \frac{P_{max,q}}{\sum_{k=1}^{N} \sum_{j=1}^{M_r} |w_{k,q,j}|^2} \right]. \tag{32}$$

The other parameters were set as follows. In this simulations, the parameters $\epsilon_1, \epsilon_2$ and $\epsilon_3$ were set to 0 for observation of the convergence in the first embodiment.

[Parameters in Case Where Initial Barrier Parameter is Uniquely Determined]

$P_{k,j\ initial} = (1/6) \times (1/3)$, r(1)=1.0,

α=0.2, $I_{max}$=1,000, and $\epsilon_4 = 10^{-3}$.

Parameters in the First Embodiment

α=0.2, $I_{max}$=100 (interior point method processing unit 33), $I_{max}$=1,000 (interior point method processing unit 22), and

ϵ4=$10^{-3}$.

FIG. 13A illustrates resultant relationship characteristics of average convergence values and average numbers of steepest descent method iterations between the optimization in the case of the initial barrier parameter being uniquely determined and the optimization in the first embodiment based on the Fairness criteria. In the illustration, "Basic" represents the characteristics in the case of the optimization for r(1)=1.0, and "Proposed" represents the characteristics in the optimization of the present invention. Also, the vertical axis represents the average minimum user throughput, and the horizontal axis represents the average number of steepest descent method iterations.

As observed in FIG. 13A, "Basic" requires more than 8,000 steepest descent method iterations on average until convergence while "Proposed" can achieve convergence about 5,000 iterations on average.

FIG. 13B illustrates comparison averages numbers of steepest descent method iterations required for convergence depending on different numbers of users. In FIG. 13B, the vertical axis represents the number of average steepest descent method iterations, and the horizontal axis represents the number of users. As observed in FIG. 13B, the iterations can be reduced independently of the number of users. Note that "Proposed" can reduce the number of average steepest descent method iterations by about 26% to 34% compared to "Basic".

Figure 14A:
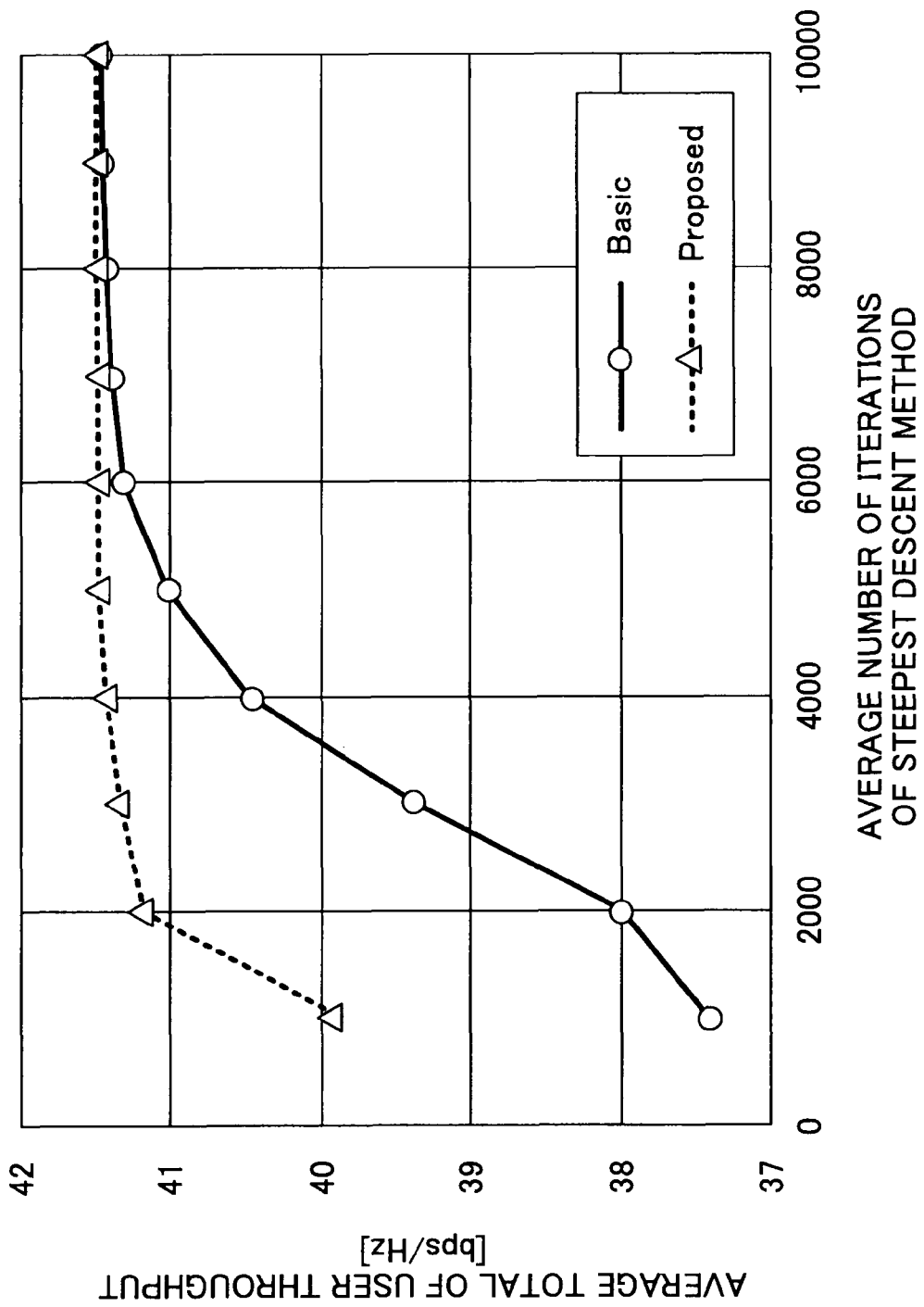

FIG. 14A illustrates resultant relationship characteristics of average convergence values and average numbers of steepest descent method iterations between the optimization in the case of the initial barrier parameter being uniquely determined and the optimization in the first embodiment based on the Sum-rate criteria. In the illustration, "Basic" represents the characteristics in the case of the optimization for $r(1)=1.0$, and "Proposed" represents the characteristics in the optimization of the present invention. Also, the vertical axis represents the average total amount of user throughput, and the horizontal axis represents the average number of steepest descent method iterations.

As observed in FIG. 14A, "Basic" requires more than 8,000 steepest descent method iterations on average until convergence while "Proposed" can achieve convergence about 5,000 iterations on average.

FIG. 14B illustrates comparison averages numbers of steepest descent method iterations required for convergence depending on different numbers of users. In FIG. 14B, the vertical axis represents the number of average steepest descent method iterations, and the horizontal axis represents the number of users. As observed in FIG. 14B, the iterations can be reduced independently of the number of users. Note that "Proposed" can reduce the number of average steepest descent method iterations by about 33% to 36% compared to "Basic".

The present invention has been described with reference to the specific embodiments of the present invention, but the embodiments are simply illustrative and variations, modifications, alterations and substitutions could be contrived by those skilled in the art. Some specific formulae have been used to facilitate understanding of the present invention, but unless otherwise noted, these numerals are simply illustrative and any other appropriate formula may be used. Separation of the embodiments or sections is not essential to the present invention, and two or more of the embodiments or the sections may be used together as needed. For convenience of explanation, some apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This application is based upon and claims the benefit of priority of Japanese Patent Application No. 2009-105638, filed on Apr. 23, 2009, the entire contents of which are incorporated herein by reference.

What is claimed is:

1. A radio communication apparatus including multiple transmit antennas, the radio communication apparatus for allocating transmit power to the transmit antennas below transmit power limits of the respective transmit antennas or multiple transmit antenna groups, each of the transmit antenna groups consisting of one or more of the multiple transmit antennas, to transmit a radio signal, the apparatus comprising:
    a modulation unit configured to modulate information signal sequences to transmit to respective users;
    a precoding weight calculation unit configured to precode the modulated information signal sequences to calculate transmit weight information for the respective users;
    an initial transmit power setup unit configured to set initial transmit power based on prior information including the calculated transmit weight information or eigenvalue distribution information;
    an initial barrier parameter setup unit configured to generate an objective function of a user channel capacity for a constrained optimization problem based on the calculated transmit weight information and the set initial transmit power, generate a new objective function by adding a barrier function adjusted with a barrier parameter to the objective function for the constrained optimization problem, use an initial temporary barrier parameter to initiate iteration of an optimization operation for the new objective function, store an output of each step operation in the optimization operation, and set an initial barrier parameter based on comparison between the current output and the previous output;
    a transmit power calculation unit configured to calculate transmit power to optimize the new objective function in accordance with an interior point method based on the initial transmit power set by the initial transmit power setup unit and the initial barrier parameter set by the initial barrier parameter setup unit; and
    a transmit unit configured to allocate the calculated transmit power to the respective transmit antennas to transmit the radio signal.

2. The radio communication apparatus as claimed in claim 1, wherein the initial barrier parameter setup unit uses the objective function for the constrained optimization problem to generate the output of each step operation in the optimization operation.

3. The radio communication apparatus as claimed in claim 1, wherein the initial barrier parameter setup unit uses the new objective function to generate the output of each step operation in the optimization operation.

4. The radio communication apparatus as claimed in claim 1, wherein the initial transmit power setup unit sets the initial transmit power for each optimization operation by the initial barrier parameter setup unit.

5. The radio communication apparatus as claimed in claim 1, wherein the initial barrier parameter setup unit uses the transmit power derived in the previous optimization operation to iterate the optimization operation for the new objective function.

6. The radio communication apparatus as claimed in claim 1, wherein
    the initial barrier parameter setup unit performs the optimization operation in accordance with a steepest descent method to optimize the new objective function, and
    the transmit power calculation unit performs the optimization operation in accordance with the steepest descent method to optimize the new objective function below the transmit power limit.

7. The radio communication apparatus as claimed in claim 6, wherein
    the initial barrier parameter setup unit terminates step iteration in the steepest descent method if a variation of the new objective function to a variation of the transmit power is within a predefined threshold, if a variation of the objective function for the constrained optimization problem to an increment of the step iteration is within a predefined threshold, or if a number of the step iterations exceeds a predefined threshold, and the transmit power calculation unit terminates the step iteration in the steepest descent method if a variation of the new objective function to a variation of the transmit power is within a predefined threshold, if a variation of the objective function for the constrained optimization problem to an increment of the step iteration is within a predefined threshold, or if a number of the step iterations exceeds a predefined threshold.

8. The radio communication apparatus as claimed in claim 1, wherein the transmit power calculation unit terminates step iteration in the interior point method if the barrier parameter is below a predefined threshold or if a variation of the objective function for the constrained optimization problem to an increment of the step iteration is within a predefined threshold.

9. The radio communication apparatus as claimed in claim 1, wherein the transmit power calculation unit performs the optimization such that channel capacities for the respective users are made uniform based on the transmit power limit.

10. The radio communication apparatus as claimed in claim 1, wherein the transmit power calculation unit performs the optimization such that an overall system channel capacity is maximized based on the transmit power limit.

11. A method for use in a radio communication apparatus including multiple transmit antennas, the radio communication apparatus for allocating transmit power to the transmit antennas below transmit power limits of the respective transmit antennas or multiple transmit antenna groups, each of the transmit antenna groups consisting of one or more of the multiple transmit antennas, to transmit a radio signal, the method comprising:

modulating information signal sequences to transmit to respective users;

precoding the modulated information signal sequences to calculate transmit weight information for the respective users;

setting initial transmit power based on prior information including the calculated transmit weight information or eigenvalue distribution information;

generating an objective function of a user channel capacity for a constrained optimization problem based on the calculated transmit weight information and the set initial transmit power and generating a new objective function by adding a barrier function adjusted with a barrier parameter to the objective function for the constrained optimization problem;

using an initial temporary barrier parameter to initiate iteration of an optimization operation for the new objective function, storing an output of each step operation in the optimization operation, and setting an initial barrier parameter based on comparison between the current output and the previous output;

calculating transmit power to optimize the new objective function in accordance with an interior point method based on the set initial transmit power and the set initial barrier parameter; and allocating the calculated transmit power to the respective transmit antennas to transmit the radio signal.

12. The method as claimed in claim 11, wherein the step of setting the initial barrier parameter comprises using the objective function for the constrained optimization problem to generate the output of each step operation in the optimization operation.

13. The method as claimed in claim 11, wherein the step of setting the initial barrier parameter comprises using the new objective function to generate the output of each step operation in the optimization operation.

14. The method as claimed in claim 11, wherein the step of setting the initial transmit power comprises setting the initial transmit power for each optimization operation at the step of setting the initial barrier parameter.

15. The method as claimed in claim 11, wherein the step of setting the initial barrier parameter comprises using the transmit power derived in the previous optimization operation to iterate the optimization operation for the new objective function.

16. The method as claimed in claim 11, wherein the step of setting the initial barrier parameter comprises performing the optimization operation in accordance with a steepest descent method to optimize the new objective function, and the step of calculating the transmit power comprises performing the optimization operation in accordance with the steepest descent method to optimize the new objective function below the transmit power limit.

17. The method as claimed in claim 16, wherein the step of setting the initial barrier parameter comprises terminating step iteration in the steepest descent method if a variation of the new objective function to a variation of the transmit power is within a predefined threshold, if a variation of the objective function for the constrained optimization problem to an increment of the step iteration is within a predefined threshold, or if a number of the step iterations exceeds a predefined threshold, and the step of calculating the transmit power comprises terminating the step iteration in the steepest descent method if a variation of the new objective function to a variation of the transmit power is within a predefined threshold, if a variation of the objective function for the constrained optimization problem to an increment of the step iteration is within a predefined threshold, or if a number of the step iterations exceeds a predefined threshold.

18. The method as claimed in claim 11, wherein the step of calculating the transmit power comprises terminating step iteration in the interior point method if the barrier parameter is below a predefined threshold or if a variation of the objective function for the constrained optimization problem to an increment of the step iteration is within a predefined threshold.

19. The method as claimed in claim 11, wherein the step of calculating the transmit power comprises performing the optimization such that channel capacities for the respective users are made uniform based on the transmit power limit.

20. The method as claimed in claim 11, wherein the step of calculating the transmit power comprises performing the optimization such that an overall system channel capacity is maximized based on the transmit power limit.

* * * * *